Jan. 26, 1954 M. DEN HERTOG ET AL 2,667,540

SELECTION SYSTEM FOR ELECTRICAL CIRCUITS OR EQUIPMENTS

Filed June 14, 1950 10 Sheets-Sheet 1

Inventors
MARTINUS DEN HERTOG
CONSTANTINUS DE ZEEUW

By Robert Harding Jr.
Attorney

SELECTION SYSTEM FOR ELECTRICAL CIRCUITS OR EQUIPMENTS

Filed June 14, 1950 10 Sheets-Sheet 2

Inventors
MARTINUS DEN HERTOG
CONSTANTINUS DE ZEEUW
By Robert Harding Jr.
Attorney Jan. 26, 1954 M. DEN HERTOG ET AL 2,667,540

SELECTION SYSTEM FOR ELECTRICAL CIRCUITS OR EQUIPMENTS

Filed June 14, 1950 10 Sheets-Sheet 3

Inventors
MARTINUS DEN HERTOG
CONSTANTINUS DE ZEEUW
By Robert Harding Jr.
Attorney

SELECTION SYSTEM FOR ELECTRICAL CIRCUITS OR EQUIPMENTS

Filed June 14, 1950 10 Sheets-Sheet 4

Inventors
MARTINUS DEN HERTOG
CONSTANTINUS DE ZEEUW
By Robert Harding Jr.
Attorney

SELECTION SYSTEM FOR ELECTRICAL CIRCUITS OR EQUIPMENTS

Inventors
MARTINUS DEN HERTOG
CONSTANTINUS DE ZEEUW
By Robert Harding Jr.
Attorney Inventors
MARTINUS DEN HERTOG
CONSTANTINUS DE ZEEUW
By [signature]
Attorney Inventors
MARTINUS DEN HERTOG
CONSTANTINUS DE ZEEUW
By [signature]
Attorney Jan. 26, 1954 M. DEN HERTOG ET AL 2,667,540

SELECTION SYSTEM FOR ELECTRICAL CIRCUITS OR EQUIPMENTS

Filed June 14, 1950 10 Sheets-Sheet 8

FIG. 7.

| COMB | $P_a$ | $P_b$ | $P_c$ | | COMB | $P_a$ | $P_b$ | $P_c$ | | COMB | $P_a$ | $P_b$ | $P_c$ | | COMB | $P_a$ | $P_b$ | $P_c$ | |
|---|---|---|---|---|---|---|---|---|---|---|---|---|---|---|---|---|---|---|---|
| 00 | 1 | 1 | 1 | 1 | 25 | 1 | 1 | 2 | 31 | 50 | 1 | 1 | 3 | 61 | 75 | 1 | 1 | 4 | 91 |
| 01 | 2 | 1 | 1 | 2 | 26 | 2 | 1 | 2 | 32 | 51 | 2 | 1 | 3 | 62 | 76 | 2 | 1 | 4 | 92 |
| 02 | 3 | 1 | 1 | 3 | 27 | 3 | 1 | 2 | 33 | 52 | 3 | 1 | 3 | 63 | 77 | 3 | 1 | 4 | 93 |
| 03 | 4 | 1 | 1 | 4 | 28 | 4 | 1 | 2 | 34 | 53 | 4 | 1 | 3 | 64 | 78 | 4 | 1 | 4 | 94 |
| 04 | 5 | 1 | 1 | 5 | 29 | 5 | 1 | 2 | 35 | 54 | 5 | 1 | 3 | 65 | 79 | 5 | 1 | 4 | 95 |
| 05 | 1 | 2 | 1 | 7 | 30 | 1 | 2 | 2 | 37 | 55 | 1 | 2 | 3 | 67 | 80 | 1 | 2 | 4 | 97 |
| 06 | 2 | 2 | 1 | 8 | 31 | 2 | 2 | 2 | 38 | 56 | 2 | 2 | 3 | 68 | 81 | 2 | 2 | 4 | 98 |
| 07 | 3 | 2 | 1 | 9 | 32 | 3 | 2 | 2 | 39 | 57 | 3 | 2 | 3 | 69 | 82 | 3 | 2 | 4 | 99 |
| 08 | 4 | 2 | 1 | 10 | 33 | 4 | 2 | 2 | 40 | 58 | 4 | 2 | 3 | 70 | 83 | 4 | 2 | 4 | 100 |
| 09 | 5 | 2 | 1 | 11 | 34 | 5 | 2 | 2 | 41 | 59 | 5 | 2 | 3 | 71 | 84 | 5 | 2 | 4 | 101 |
| 10 | 1 | 3 | 1 | 13 | 35 | 1 | 3 | 2 | 43 | 60 | 1 | 3 | 3 | 73 | 85 | 1 | 3 | 4 | 103 |
| 11 | 2 | 3 | 1 | 14 | 36 | 2 | 3 | 2 | 44 | 61 | 2 | 3 | 3 | 74 | 86 | 2 | 3 | 4 | 104 |
| 12 | 3 | 3 | 1 | 15 | 37 | 3 | 3 | 2 | 45 | 62 | 3 | 3 | 3 | 75 | 87 | 3 | 3 | 4 | 105 |
| 13 | 4 | 3 | 1 | 16 | 38 | 4 | 3 | 2 | 46 | 63 | 4 | 3 | 3 | 76 | 88 | 4 | 3 | 4 | 106 |
| 14 | 5 | 3 | 1 | 17 | 39 | 5 | 3 | 2 | 47 | 64 | 5 | 3 | 3 | 77 | 89 | 5 | 3 | 4 | 107 |
| 15 | 1 | 4 | 1 | 19 | 40 | 1 | 4 | 2 | 49 | 65 | 1 | 4 | 3 | 79 | 90 | 1 | 4 | 4 | 109 |
| 16 | 2 | 4 | 1 | 20 | 41 | 2 | 4 | 2 | 50 | 66 | 2 | 4 | 3 | 80 | 91 | 2 | 4 | 4 | 110 |
| 17 | 3 | 4 | 1 | 21 | 42 | 3 | 4 | 2 | 51 | 67 | 3 | 4 | 3 | 81 | 92 | 3 | 4 | 4 | 111 |
| 18 | 4 | 4 | 1 | 22 | 43 | 4 | 4 | 2 | 52 | 68 | 4 | 4 | 3 | 82 | 93 | 4 | 4 | 4 | 112 |
| 19 | 5 | 4 | 1 | 23 | 44 | 5 | 4 | 2 | 53 | 69 | 5 | 4 | 3 | 83 | 94 | 5 | 4 | 4 | 113 |
| 20 | 1 | 5 | 1 | 25 | 45 | 1 | 5 | 2 | 55 | 70 | 1 | 5 | 3 | 85 | 95 | 1 | 5 | 4 | 115 |
| 21 | 2 | 5 | 1 | 26 | 46 | 2 | 5 | 2 | 56 | 71 | 2 | 5 | 3 | 86 | 96 | 2 | 5 | 4 | 116 |
| 22 | 3 | 5 | 1 | 27 | 47 | 3 | 5 | 2 | 57 | 72 | 3 | 5 | 3 | 87 | 97 | 3 | 5 | 4 | 117 |
| 23 | 4 | 5 | 1 | 28 | 48 | 4 | 5 | 2 | 58 | 73 | 4 | 5 | 3 | 88 | 98 | 4 | 5 | 4 | 118 |
| 24 | 5 | 5 | 1 | 29 | 49 | 5 | 5 | 2 | 59 | 74 | 5 | 5 | 3 | 89 | 99 | 5 | 5 | 4 | 119 |

Inventors
MARTINUS DEN HERTOG
CONSTANTINUS DE ZEEUW
By Robert Harding Jr.
Attorney Inventors
MARTINUS DEN HERTOG
CONSTANTINUS DE ZEEUW By [signature]
Attorney FIG. 11.
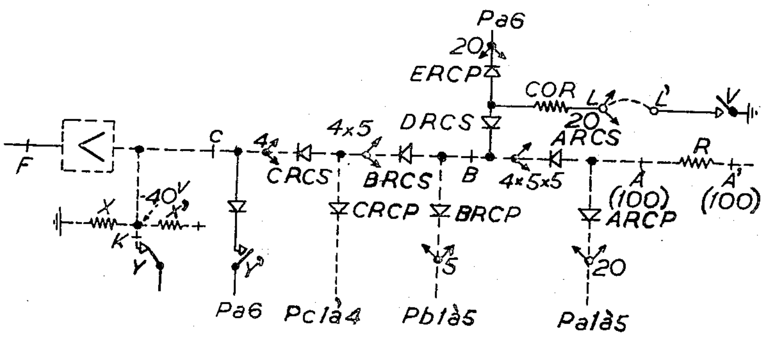
FIG. 12.
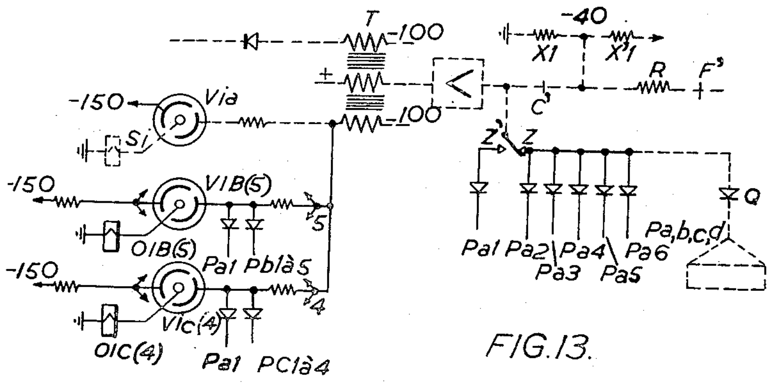
FIG. 13.
| | |
|---|---|
| Fig. 2. | Fig. 3. |
| Fig. 1. | Fig. 4. |
| | Fig. 5. |
Inventors
MARTINUS DEN HERTOG
CONSTANTINUS DE ZEEUW
By Robert Harding Jr.
Attorney Patented Jan. 26, 1954 2,667,540

UNITED STATES PATENT OFFICE 2,667,540

SELECTION SYSTEM FOR ELECTRICAL CIRCUITS OR EQUIPMENTS

Martinus den Hertog and Constantinus de Zeeuw, Antwerp, Belgium, assignors to International Standard Electric Corporation, New York, N. Y., a corporation of Delaware Application June 14, 1950, Serial No. 168,071

Claims priority, application France June 30, 1949

29 Claims. (Cl. 179—18)

The present invention relates to a selection system for electrical circuits or equipment, more particularly, but not exclusively for automatic telephone exchanges.

One characteristic of the invention consists in a system of automatic telecommunication comprising arrangements for directly selecting, in a single operation, a particular outgoing circuit from a number of outgoing circuits comprising several groups.

Another characteristic of the invention consists in an automatic telecommunication system, comprising static electrcial devices for directly selecting, in a single operation, a particular outgoing circuit from a number of outgoing circuits comprising several groups.

Another characteristic of the invention consists in an automatic telecommunication system comprising arrangements for the direct selection and testing, in a single operation, of a particular outgoing circuit from a number of outgoing circuits comprising several groups.

Another characteristic of the invention consists of an automatic telecommunication system comprising a selector switch circuit adapted to apply in turn to a common test circuit a series of different signals each of which relates to a different outgoing circuit, and which by its identity defines the identity and the condition of the outgoing circuit with which said signal is associated.

Another characteristic of the invention consists in an automatic telecommunication system comprising a selector switch circuit with arrangements for applying to a common test circuit a different test characteristic for each of the outgoing circuits, said characteristic identifying the corresponding outgoing circuit, and with arrangements for automatically changing the test characteristic associated with an outgoing circuit from one to another of a plurality of different characteristics allocated individually to said outgoing circuit when the condition of said circuit changes, for example, when the circuit passes from the free state to the busy state, each characteristic allocated to an outgoing circuit identifying said circuit and its condition.

Another characteristic of the invention consists in the fact that the state of the line (free, local busy, toll busy), is signalled by special characteristics, to the register controller, while the selecting operation is carried out.

Another characteristic of the invention consists in a selector switching circuit in which each outgoing circuit has $m$ different test characteristics which are allocated to it, arrangements being provided for temporarily associating one of the $m$ characteristics with said circuit, the total number $m \times n$ of different test characteristics forming $m$ different sets, each set having a common factor and no two sets having the same common factor, one characteristic from each group constituting the $m$ characteristics allocated to each outgoing circuit, arrangements being made so that a plurality of sets of characteristics are each used to characterise the identity and a particular condition of the outlets (free or busy) and that a plurality of sets of characteristics are each used to characterise the identity and a particular class of outlets (such as the first line of P. B. X).

Another characteristic of the invention consists in a selector switch circuit in which an automatic change of the characteristic, associated with an outgoing circuit when the said circuit becomes busy, automatically suppresses the indication of class-of-outlet previously given.

Another characteristic of the invention consists of a selector switch circuit in which the test characteristics are composed of electric impulses in a cycle of impulses situated in time, said cycle having at least as many time units as there are test characteristics to be provided.

Another characteristic of the invention consists in a final selector switch circuit comprising one of the individual selectors of a multi-switch, in which the operation is effected by means under the control of the corresponding part of the wanted designation in order to select a particular line, arrangements being provided to check the type of line selected and to cause the operation of other means, after the type-of-line check has been made, in order to connect the incoming circuit to the line selected.

Another characteristic of the invention consists in a final selector switch circuit comprising one of the individual selectors of a multi-switch, comprising means for connecting up the line-type checking means for checking purposes whether the line selected is free or busy.

Another characteristic of the invention consists of an automatic telecommunication system comprising final selection devices having access to several groups of lines, each allocated to a particular subscriber, and also a control equipment for said final selection devices, arrangements being provided for applying group test characteristics (P. B. X) to a certain number of outlets of final selection devices, said lines being placed in any desired positions among the line assembly, and all or some of said positions not being consecutive, means being provided for the successive testing of all the lines of the group (P. B. X) until a free line is found.

Another characteristic of the invention consists in an automatic telecommunication system comprising final selection devices having access to several line groups, as also a control equipment for said final selector devices, arrangements being provided for appyling test potentials to lines of a particular subscriber's group (P. B. X) which characterise both the identity of the line and its group character.

Another characteristic of the invention consists in an automatic telecommunication system comprising final selection devices having access to several groups of lines (P. B. X) and control equipment for said final selector devices, arrangements being provided for testing a line to determine whether it is free or busy, in order, if it is busy, to make another test on the same channel already used to test the free or busy condition of the line and to effect a hunt in the P. B. X group when a busy line is found to be a line belonging to a group (P. B. X) as a result of the second test.

Another characteristic of the invention consists of an automatic telecommunication circuit comprising final selection devices having access to several line groups (P. B. X) and control equipment for said final selection devices, means being provided for applying test characteristics to a number of consecutive lines (P. B. X) placed in any desired positions among several groups of lines without any restriction, arrangements being made to modify the control exercised by the control equipment when a line of a group (P. B. X) other than the last is found busy, so that said control equipment selects and tests the next line of the group (P. B. X).

Another characteristic of the invention consists in a system of automatic telecommunication in which selection control equipment is marked for selection purposes in accordance with the number of the desired line which has been registered, means being provided to modify the marking of the selection control equipment, the characteristics identifying any busy line which has just been tested being eliminated, to be replaced by characteristics identifying the adjacent line in the group of lines allocated to a particular subscriber.

Another characteristic of the invention consists of an automatic telecommunication system, comprising final selector devices associated with a control equipment and capable of hunting among several groups of lines (P. B. X) distributed in any desired manner, arrangments being provided to mark said control equipment in accordance with the number of the desired line which has been registered, and to modify said marking if the line tested is a busy line forming part of a group of non-consecutive lines (P. B. X), the characteristic identifying said busy line being replaced by a characteristic peculiar to the subscriber's line group (P. B. X).

Another characteristic of the invention consists of an automatic telecommunication system in which the register-controllers comprise arrangements for marking devices for controlling the selection in accordance with the wanted line number which has been stored, means being provided for applying test characteristics to the busy lines of a group of lines, which may or may not be consecutive, allocated to a particular subscriber (P. B. X) and arrangements being provided in the register-controllers to respond to the group characteristics (P. B. X) and in response to said characteristics to change the marking of the selection control, the characteristics identifying the busy line which has just been tested being eliminated, to be replaced by characteristics which identify the next line of the group (P. B. X) in the outgoing lines of the connector.

Another characteristic of the invention consists in an automatic telecommunication system in which a desired line is selected under the control of a register controller in accordance with the number of the desired line which has been registered, means being provided first of all to test the condition of the selected line in order then to connect a signal-receiving equipment to the selected line to receive and register, if necessary, the indication of the group to which the line belongs, arrangements being provided so that if the line selected is one of a group (P. B. X) and is busy, the control marking of the selection may be modified in accordance with the group indication (P. B. X) which has been registered, the selection operations being resumed so that a free line of the registered group is selected.

Another characteristic of the invention consists in an automatic telecommunication system comprising arrangements for selecting a desired line under the control of a register-controller, arrangements being provided to make first of all a condition test on a selected line, in order secondly to connect a signal-receiving equipment to the selected line to receive and record information relating to the group (P. B. X) to which the line belongs, if necessary, means being provided, if the selected line belongs to a group of subscriber's lines (P. B. X) and if it is busy, to effect a test within the group (P. B. X) of which the identity has been recorded in order to record the identity of a free group line selected (P. B. X), means also being provided to act under the control of said line-identity recording means and to set an individual switch of a multi-switch on said line.

Another characteristic of the invention consists of an automatic telecommunication system comprising means for allocating $(m \times n + o)$ different sources of test characteristics to a final selector switch having access to $n$ lines, said test characteristics being first of all divided into two main groups $(m \times n)$ and $o$, the test characteristics within each main group having a factor common to the group and the common factor being different for each main group, the first main group $(m \times n)$ being sub-divided into $m$ sub-groups each of $n$ characteristics, the test characteristics within such a sub-group having a factor common to the sub-group, and no two sub-groups having the same common factor, arrangements being made to allocate $m$ test characteristics one from each sub-group, to each line, and for associating with each line for the purpose of selection control any one of the test characteristics allocated thereto.

Another characteristic of the invention consists of an automatic telecommunication system in which the selection control means and the P. B. X information recording means are in the register-controller, the identity recording means being associated with the final selector and the register controllers comprising means for signalling the identity of the selected line to the said identity recording means.

Another characteristic of the invention consists of an automatic telecommunication system in which the test characteristics are composed of electrical pulses corresponding to different time positions in a cycle of time positions.

Another characteristic of the invention consists in an automatic telecommunication system comprising control devices operable both when first test devices have determined that the selected line is busy and when second test devices have determined that the selected line is a line of a particular subscriber's group (P. B. X), a third test device, which is under the control of said control devices, testing on other lines of the group (P. B. X) in accordance with the common factor of the sub-group of the test characteristics associated with the group (P. B. X) said test characteristics of the sub-group being employed to control the selection of the line direct, in which case the common factor is not used, and for controlling P. B. X hunting in which case the common factor is used.

Another characteristic of the invention consists of an automatic telecommunication system comprising final selector devices associated with a control equipment adapted to hunt among several groups of lines distributed in any desired manner, arrangements being provided to apply to said groups test characteristics for a particular subscriber's line group (P. B. X) and means permitting the substitution for one or more lines of a group (P. B. X) characteristics of individual lines to the group characteristics (P. B. X) so as to select a particular line from said group (P. B. X).

Various other characteristics will appear from the following description, given as a non-limitative example, with reference to the attached drawings in which:

Figs. 1 and 1*a* when placed side by side show the circuit elements of a register-controller, sufficient to describe and explain the operation of the final selector and its common control circuit.

Fig. 2 indicates the circuits controlling selection between the register and the final selector.

Fig. 7 shows a table indicating the method of employing the impulses of Fig. 6 to control the selection.

Fig. 11 shows a diagram of the basic circuit of the device of Fig. 5 rendering it possible to scan 20 indications of class-of-subscriber's lines.

Fig. 12 shows a diagram of the basic circuit of those parts of the register used in determining the class of subscriber's line.

Fig. 13 shows the method of connection of Figs. 1 to 5.

The object of a final selector circuit is to select a subscriber's line under the control of a register in accordance with the tens and units digits of the subscriber's number.

The circuit is based on the use of a multi-switch comprising a certain number of horizontal bars, each of which may be considered as representing an individual switch capable of handling a call like a well-known single-motion switch. A hundred outlets have been provided accessible through all the individual switches. Vertical bars across all the horizontal bars and control the selection of a particular outlet which has to be connected by an individual switch by means of the horizontal bar.

A multi-switch of this type is used to serve 100 subscribers' lines and comprises a certain number of individual final selectors.

Each individual final selector circuit comprises a so-called "horizontal" magnet HM, which forms part of the multi-switch, and a relay FA.

Figure 4:
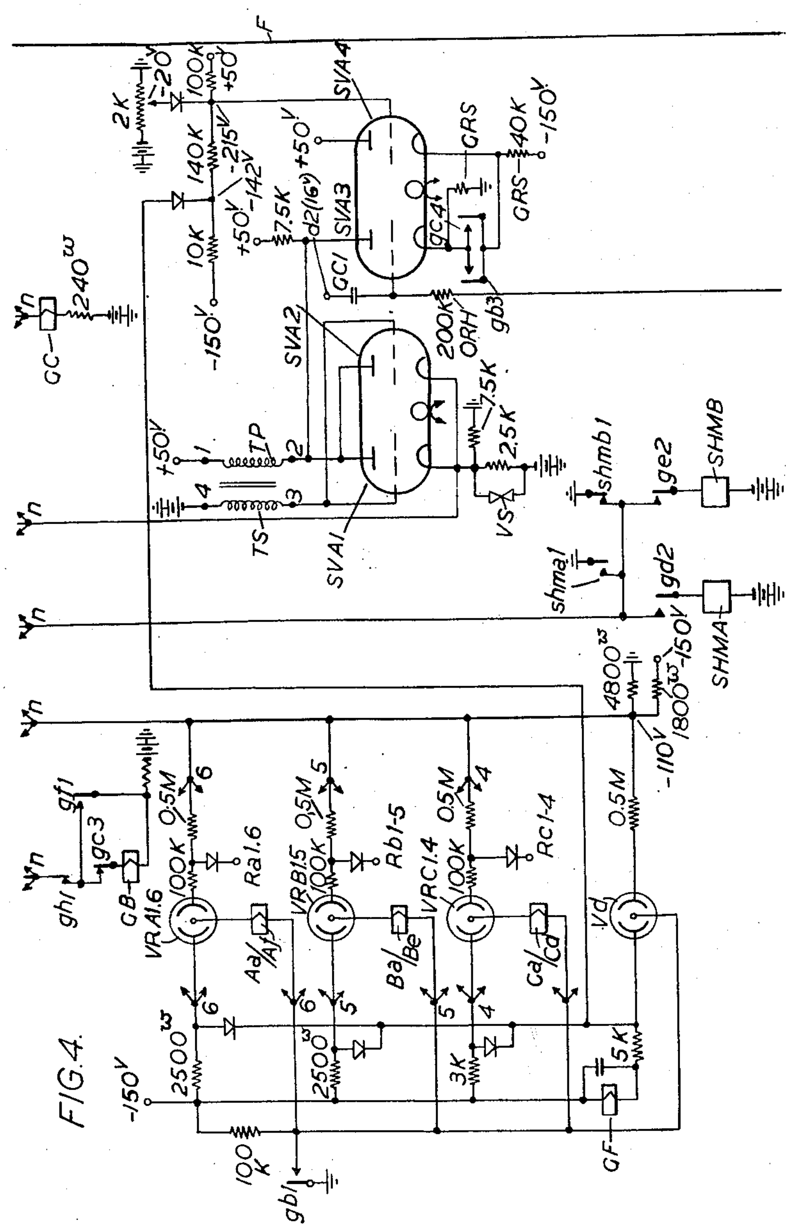
Fig. 4 and Fig. 5 show the common control circuit for a multi-switch comprising several final selectors.
Figure 5:
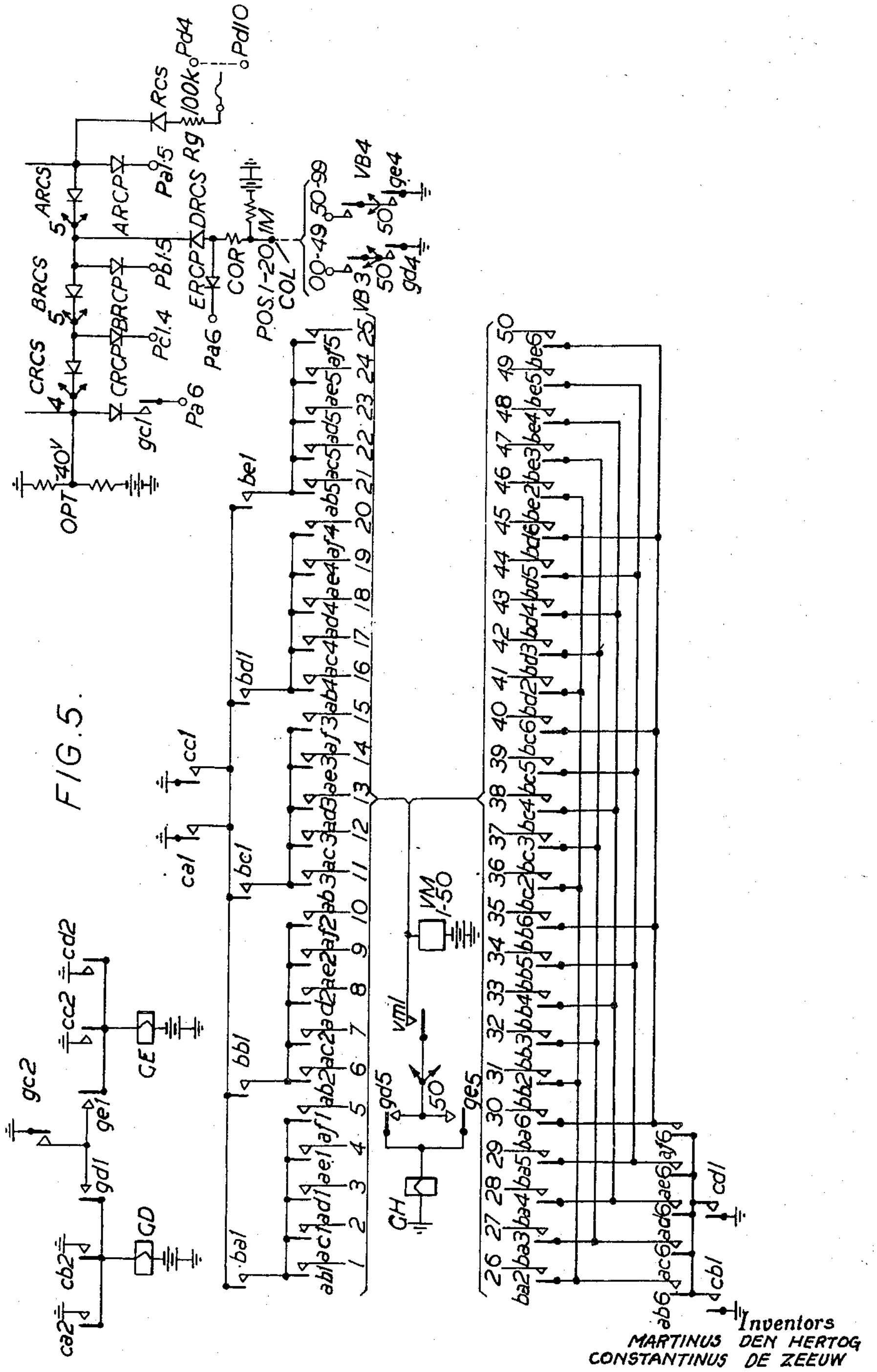

A common control switch, shown in Figs. 4 and 5, has been provided common to all the individual final selectors serving a group of 100 lines. This circuit employs electronic devices and controls the operation of a vertical bar and a horizontal bar of the multi-switch to complete a connection for only one call at a time, under the control of a register which controls the selective operations by the final selector and after the seizure of the desired outlet. The operation of the final selector circuit will be described at the same time as that of the common control circuit.

The tens digit and the hundreds digit are not selected separately; and selective operation takes place under the control both of the tens and the units digits of the wanted subscriber's number, which are sent to and recorded in the register, in order to select a particular line from the hundred lines which are accessible through one multi-switch.

Provision is made in the common control circuit of the final selector so that a class-of-line indication, chosen from several, can be given to each line by means of jumpering. The common control circuit is arranged to transmit this condition to the register handling the call, so that the latter can, if necessary, modify or prevent the operations for establishing the call, according to the class of line.

Two different ways have been provided for routing the calls to groups (P. B. X) both of which may be used either alone or in any suitable combination.

The method of routing calls to groups (P. B. X) will now be explained. Firstly, each group of 100 lines may comprise any number of small groups (P. B. X) each line of said groups having consecutive numbers, preferably in the same decade, i. e. having the same tens digit.

The common calling number of such groups is that of the line having the lowest number. The other lines of the group may be called individually, by their own number. If the line is busy, the selection of any line of a group, except the last, will cause hunting over the remaining lines of the group.

This facility is of interest when handling a large number of small groups (P. B. X) only comprising 2 or 3 city lines and equally distributed over all the 100-line groups in order to equalise the traffic.

Secondly, it is possible to form a limited number of groups (P. B. X) in each group of 100 lines, by combining any assembly of lines in one group. Thus, for example, it is possible to form a set of six groups (P. B. X) of this type, with the arrangements indicated in the common control circuit. The common calling number of the group which causes hunting in the other lines of the group if it is found busy, may be that of any line in the group; in other words this common call number is not necessarily the lowest number or highest of the lines of the group. The other lines of the group can be called individually by their number, but will not cause hunting when found busy.

This facility is useful when a single line has to be converted into a group (P. B. X), or when the number of lines in a group of the previously mentioned type has to be extended, in the particular case in which no lines are available by means of which a consecutive group of lines can be formed or extended, but in which other lines in the 100-line group can be used, and when it is desired at the same time to reach such lines by hunting, without changing the call number of the existing line or group.

The register controller comprises a digit storage device of well-known type; the circuits for connecting the register-controller to the talking circuit connecting the calling line to the final selector can also be of well-known construction.

It will therefore be assumed that the digits of the wanted subscriber's number have been received and stored and that the connection has been completed from the register controller to the final selector stage through the wires A, B, C, D. The earth through contact *ok5* and wire B causes relay FA to operate in the final selector through the back contact *hm2* of the horizontal magnet HM; it also energises relay C*h* in the register.

The operation of relay FA immediately connects the final selector circuit to the corresponding common control circuit, respectively connecting the wires A, C, and D to the common control circuit through the work contacts *fa5*, *fa2*, *fa6*.

Figure 2:
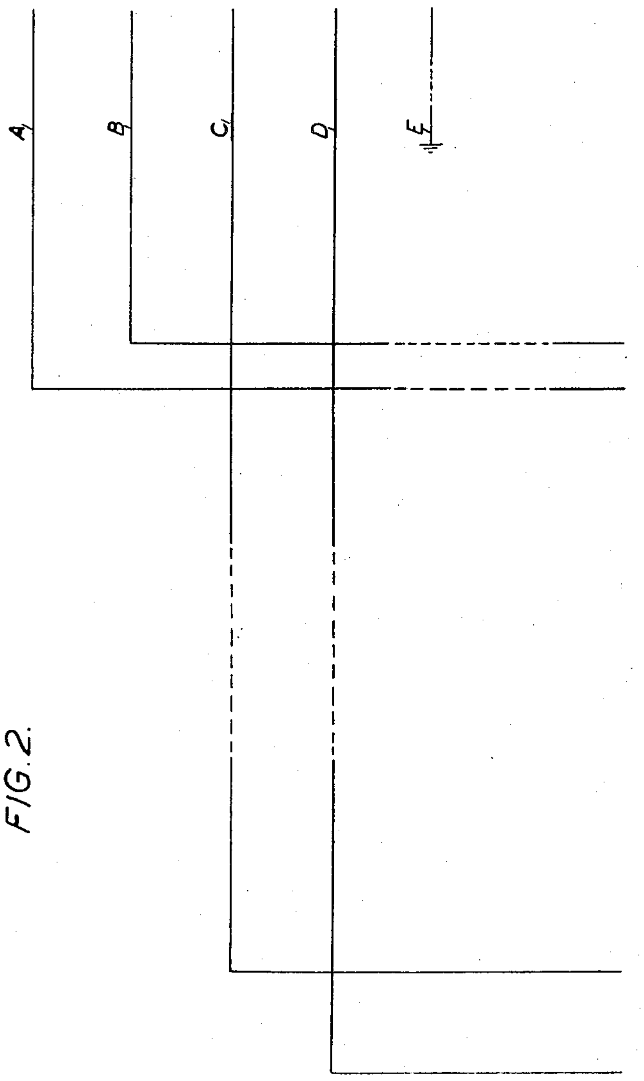
Figure 3:
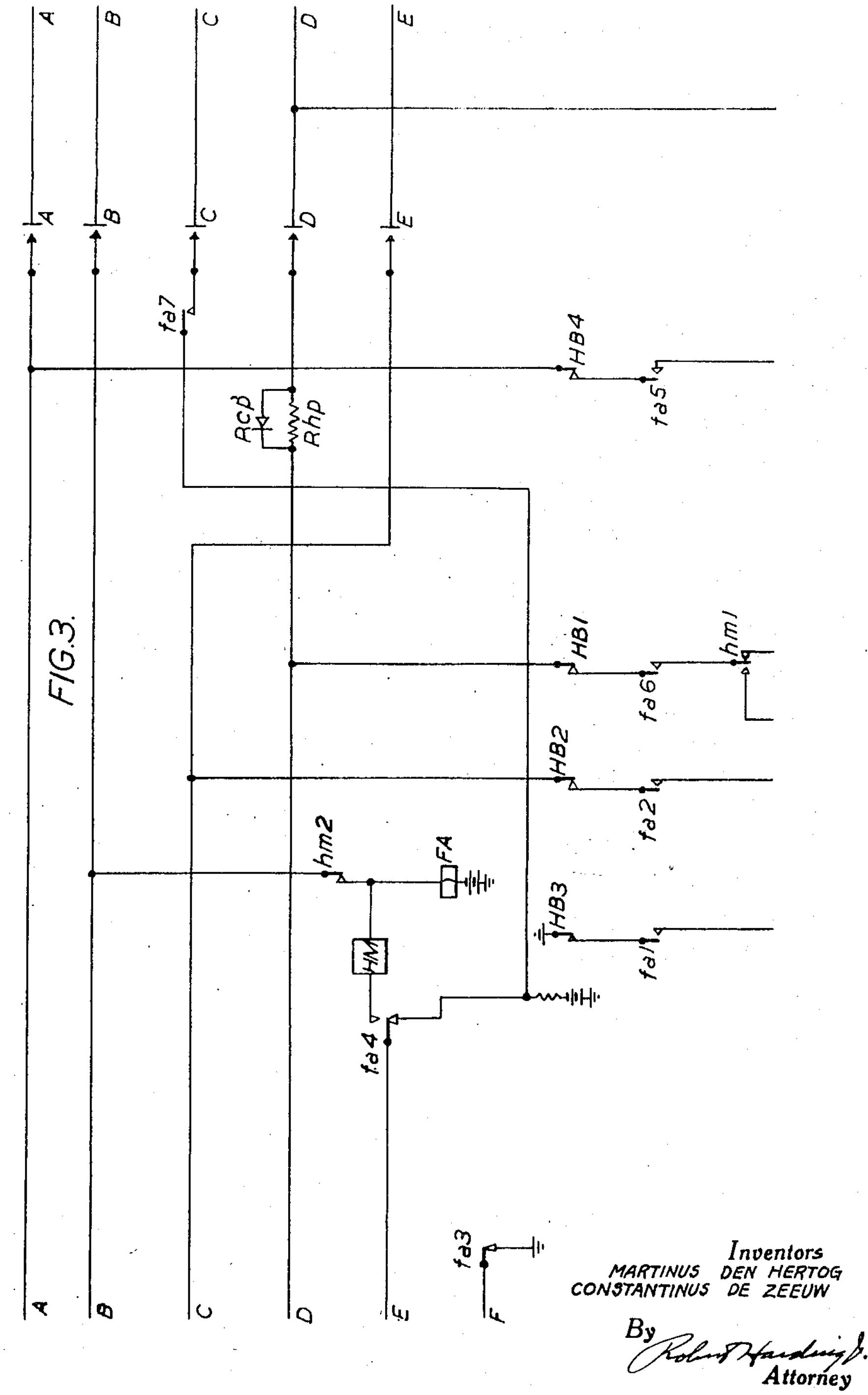
Fig. 3 shows the individual circuit of an individual final selector in a multi-switch.

Moreover, relay FA prepares a holding circuit for itself through the E-wire, in series with the winding of the horizontal magnet HM and the make contact *fa4*, but the magnet HM cannot operate at that particular moment, because direct earth is connected to both ends of its winding; the E-wire is in fact directly earthed as shown in Fig. 2.

The common control circuit is brought into operative condition, earth being transmitted in said common control circuit through the following circuit; back contact HB3 of the horizontal bar, make contact *fa1*, back contact *gh1*, back contact *gc3*. This earth energises relay GB in series with the resistance to the battery. Through its contact *gb1*, relay GB applies earth to the anodes of the cold cathode tubes VRA, VRB, VRC; V*d*, through its contact *gb3* it applies a −150 v. potential to the cathode of the left-hand portion SVA3 of a double triode SVA3, SVA4, thus preparing the common control circuit to control the selection of the wanted line by the final selector.

The 100 lines of each group of final selectors of which one is represented by the wire F, Fig. 4, are connected through a scanning device or gate having a tree formation, which is shown at the right in Fig. 5, to the grid of tube SVA3, shown in Fig. 4. The scanning device is arranged in three stages. The 100 lines are divided into groups of 5 for the first stage, each line in a group being connected through an individual rectifier ARCS to a second stage common point, thus making 25 of these second stage common points. Each group of 5 second stage common points is connected through an individual rectifier BRCS to a third stage common point, there being 4 of these third stage common points. Each of the third stage common points is connected through an individual rectifier CRCS to a single common point which is connected to a −40 v. point on a potentiometer OPT and also to the grid of tube SVA3 through a 200,000 ohm resistor ORH. The −40 v. potential is normally applied to the grid of the tube and maintains the tube in a non-conducting condition.

Each line and each common point is connected through a branch rectifier to one of a group of current sources which will be described hereinafter. One of the branch rectifiers ARCP is connected to each line; one of the branch rectifiers BRCP is connected to each second stage common point; and one of the branch rectifiers CRCP is connected to each third stage common point.

A 100,000-ohm resistance R*g* is provided in the common control circuit for each of the 100 lines accessible to one group of final selectors; one end of said resistance is connected to one of 100 terminals which are connected, as desired, to 7 electric impulse sources P*d*4 . . . P*d*10. There is one terminal to each line. The other end of resistance R*g* is connected through a rectifier R*cs* with the line and the 3 successive stages of rectifiers in series, ARCS, BRCS, CRCS.

Figure 6:
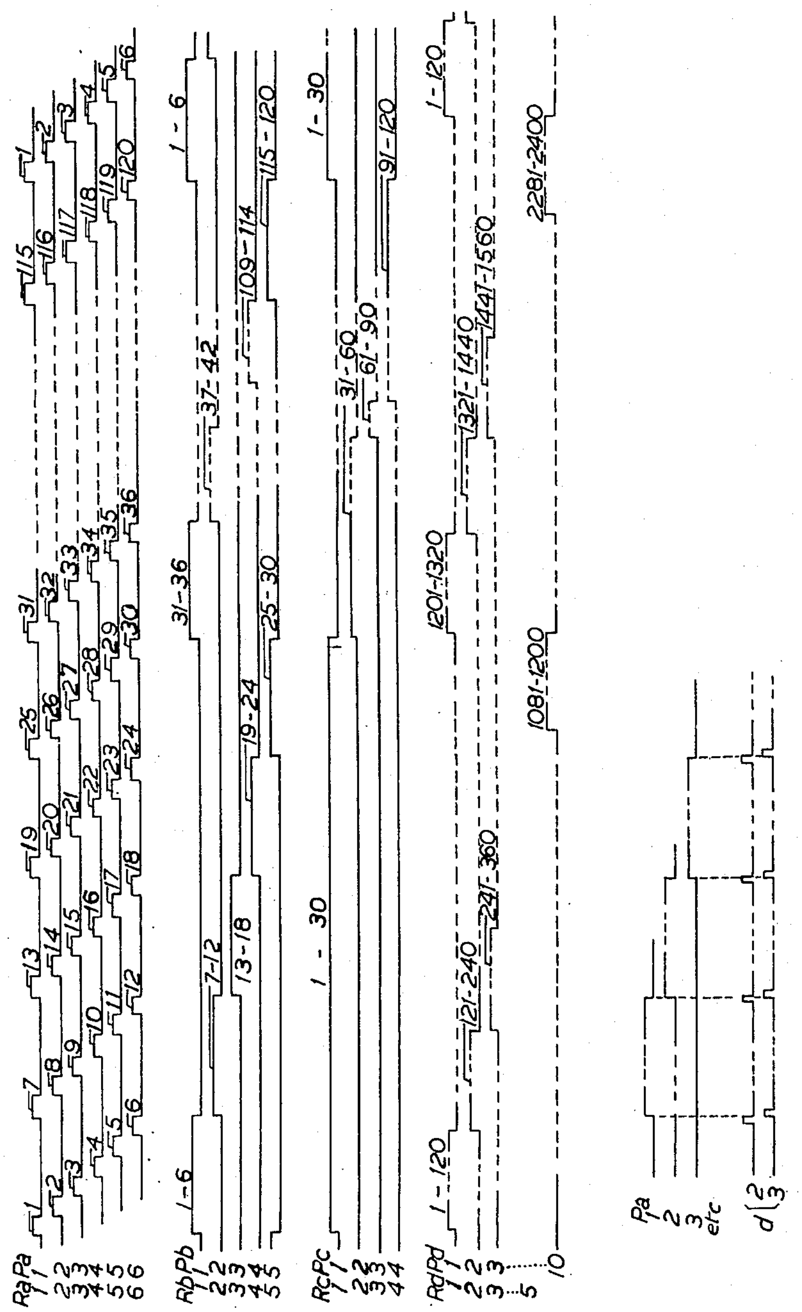
Fig. 6 shows a diagram of the cycles of impulses situated in time and used to control the selection.

Fig. 6 shows the impuse diagram given by the various sources, and used as a time basis in a 12-unit code.

There are two main groups of sources; the sources of the first group are indicated by the references P*a*, P*b*, P*c*, P*d*, and the sources of the second group by the references R*a*, R*b*, R*c*, R*d*. The chief difference between the two groups of sources consists in their difference of potential. The sources P are always used in the grid circuit of a thermionic amplifier tube, and their potential has been fixed accordingly. The sources R are always used in the control circuit of cold cathode tubes and their potentials have been adapted to the conditions for operation of the said tubes. The P sources are normally at a potential of −40 v., but at different times, corresponding to repetitive pulses, this potential is raised to −16 v. for a short instant.

Each of the two groups P*a* and R*a* comprises six sources, each source producing impulses in a periodic cycle so that together they produce impulses in six consecutive time units in a periodic cycle. The length of each impulse corresponds to the length of the time unit on which the whole system is based.

Each of the two groups P*b* and R*b* comprises five sources, each source producing impulses in a periodic cycle, so that together they produce impulses in five consecutive time units, each of said impulses corresponding to six time units of the sources P*a* and R*a* and their period to 30 such time units.

Each of the two groups P*c* and R*c* comprises four sources similarly arranged; the length of the impulses supplied by said sources corresponds to 30 time units of the sources P*a* and R*a* and their period to 120 time units.

The group P*d* comprises ten sources similarly arranged; the length of the impulses supplied by said sources corresponds to 120 time units of the sources Pa and Ra and their period to 1200 time units. These ten sources, like those of the other groups, produce impulses situated in time and displaced with respect to each other, so that the impulse supplied by each source follows that of the preceding source.

The five sources Rd are identical with sources Pd1 . . . 5 with regard to time characteristics.

Fig. 6 also shows the relations between the sources Pa and the two detector sources d2 and d3. Detector sources d2 transmits an impulse during the end of the period of emission of corresponding source Pa, even if the impulse Pa is cut off. Detector source d3 corresponding to d2, transmits an impulse at the beginning of the next emissive period of source Pa. The sources of the first three types, i. e. Pa, Pb. Pc, are used to check the transmission of a signal composed of one impulse situated in time and also the detection of a signal made up in the same way. The simultaneous use of any three sources of different types makes it possible to obtain 6×5×4=120 different time units.

In order to be able to scan the 100 outlets, said lines are distributed over the 120 time units so that the first five units only are used in each of the successive groups of 6 units, 1 . . . 6, 7 . . . 12 . . . for the line scanning, while the last unit of each group of six is not used for this function. In other words, the sources of periodic impulses Pa1 . . . 5 are used for scanning the 100 outlets, while the source Pa6 is not used for this purpose. Consequently, source Pa6 may be exclusively used to scan 20 different classes to which the lines may arbitrarily be assigned, the scanning taking place during the 20 impulses sent by said source in a period of 120 time units. These different classes are shown in a table to be described later.

Figure 1:
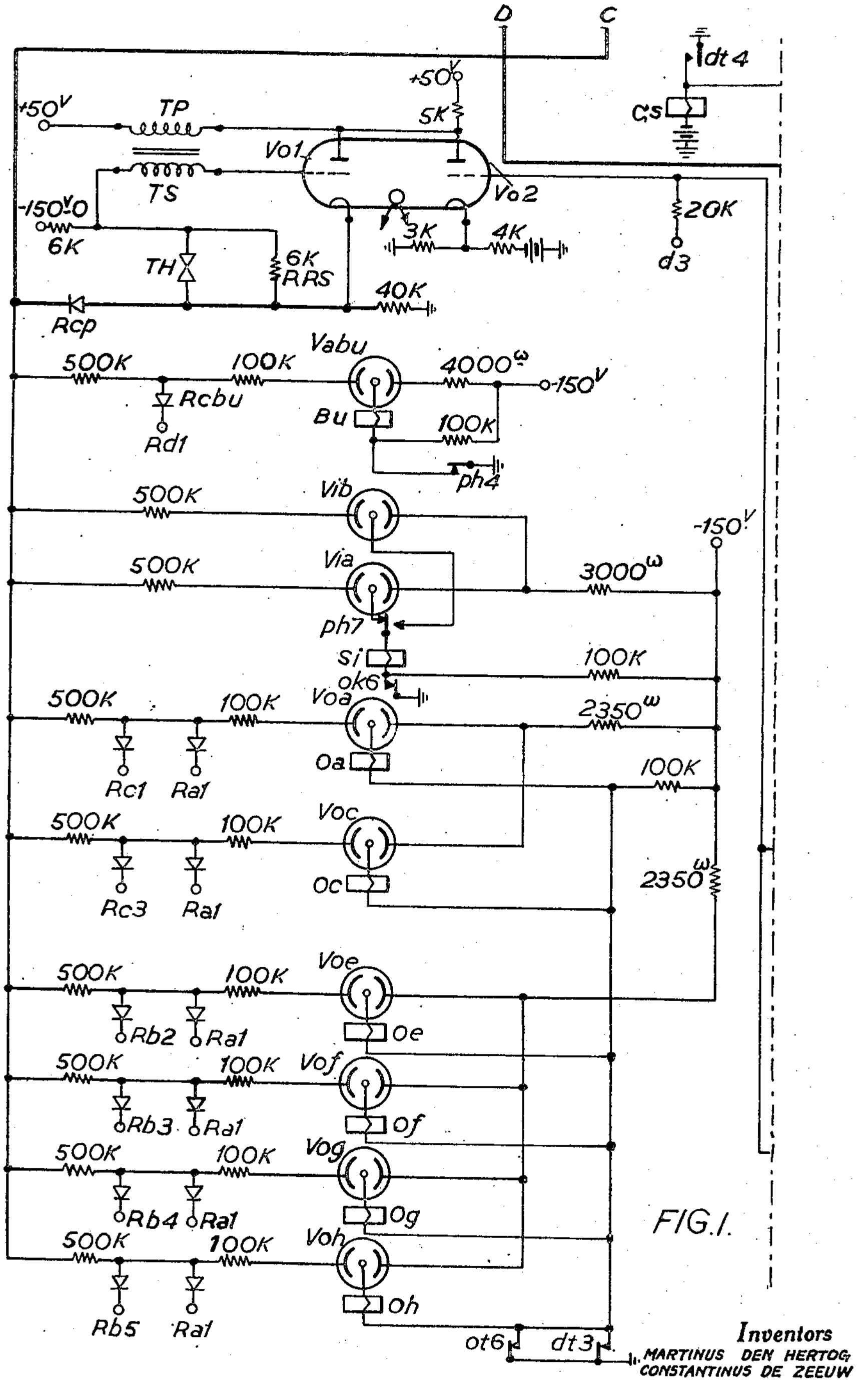
Figure 1A:
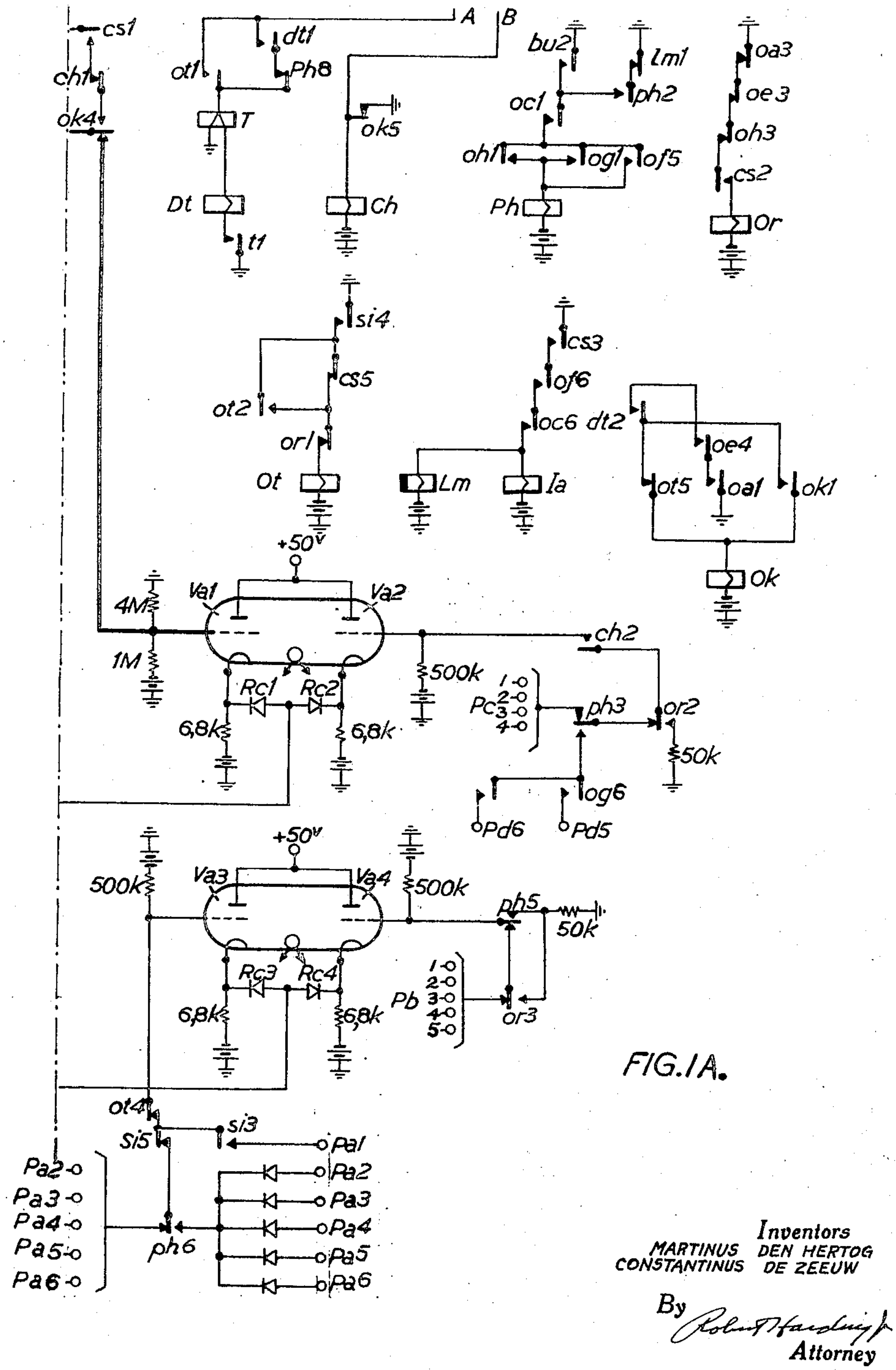

At the receiving end, i. e. the register of Figs. 1 and 1a, the impulses are received after having been displaced by one time unit, due to the successive use of detector impulses d2, d3 for the transmission and reception of the impulses, an impulse sent in time unit No. 1 being received in time unit No. 2, etc. Consequently the impulses sent out during the five first time units of each group of six will be received during the five last time units of each group of six. As a result of this, only the sources Ra2 . . . 6 are used for the reception of the impulses which characterise the 100 different outlets and which are transmitted by means of sources Pa1 . . . 5. The impulse source Ra1 is exclusively used when the 20 special indications previously mentioned are received, which have been transmitted by means of source Pa6.

Fig. 7 shows the manner of employing sending sources Pa to Pc in combination with three stages of gates in the scanning circuit of Fig. 5 for supplying impulses to the register controller. The scanning circuit or gate of Fig. 5 enables 100 outlets to send impulses to the grid circuit of an amplifier tube in 100 different time units, said tube retransmitting the impulses to the register. Fig. 7 shows the manner of connecting sources Pa to Pc to three successive gate stages, such as ARCP, BRCP, CRCP, shown on the common control circuit of the final selector. The table shows the sources to be used for the gates associated with each outlet. This table also shows in which time unit an impulse must be sent for each outlet.

It will be assumed that resistance Rg (Fig. 5) of a particular line is connected to Pd4 . . . 10 and that said source has a potential of −16 v. No current can flow from this source to the potentiometer OPT, and thence to the grid circuit of tube SVA3, unless this potential of −16 v. is simultaneously applied to the three rectifiers ARCP, BRCP, CRCP connected to the scanning circuit. When the potential supplied from the sources (or one of them) connected to ARCP, BRCP, CRCP is −40 v., and when the potential applied to Rg is −16 v., there is in effect a potential of −40 v. on the circuit, connecting the resistance Rg in the common control circuit of the final selector to the potentiometer OPT, because said −40 v. potential can be transmitted through a branch rectifier, such as ARCP which then has a low resistance; the difference of potential between the upper terminal of Rg and the source connected to the branch rectifier is absorbed in the resistance Rg and no current flows to the potentiometer. The branch rectifiers act as gates which may open or close the circuit terminating in potentiometer OPT. Current can only flow to the potentiometer when the gate device is closed by application of −16 v. potential by the associated sources. It will be clear from this that current will only flow from one of the sources Pd when all the gates controlling the circuit connecting resistance Rg of an individual line to the common potentiometer OPT are closed simultaneously. Consequently, it is only at this moment that the potential of the potentiometer and consequently that of the tube SVA3, is brought to about −16 v., due to the relative values of the various resistances placed in the circuit.

It will now be seen that the three sets of sources, Pa, Pb and Pc are connected to the gates in such a way that the moment at which these three gates are closed differs for each of the 100 lines; each of the lines, will thus supply an impulse to the grid circuit of tube SVA3 for a single time unit which characterises this line. The combination of sources to be connected to the various gates which enables this result to be obtained for the various outlets numbered "00" to "99" is shown in Fig. 7; this figure also shows the time unit in which each of the outlets supplies an impulse. It will be noted that this table mentions time units numbered from 1 to 120, arrangements being provided so that the sixth unit of each group of six is not used for sending impulses, 100 units out of 120 being used for the 100 lines.

As indicated, each of the lines is connected to an individual rectifier associated with one of the sources Pa1 . . . 5; but it is also connected to one of the sources Pd4 to Pd10 through rectifier Rcs, resistance Rg and a jumpering connection.

This connection provides a means of grouping the lines in addition to the class-of-line grouping already referred to. It has no effect on the line-identifying pulses Pa, Pb, Pc.

It is obvious that the −16 v. potential supplied by the source Pd connected to the line will be absorbed in resistance Rg and that the potential on the upper terminal of this resistance will be kept at −40 v., unless the source Pa to which the individual test wire is connected is supplying a −16 v. potential. In other words, for a line connected to source Pd4 the potential on the upper terminal Rg must be brought to a value which can influence the grid of SVA3 during the period in which source Pd4 is relatively positive; i. e. in the time units No. 361 . . . 480. Similarly, a line or lines connected to Pd5, can only affect the potential of the grid circuit in the time units 481 . . . 600.

It is clear from the above that, for each individual line, a —16 v. impulse will only be applied to the grid circuit of tube SVA3 for one only of the 1200 time units characterising the line concerned.

For example, line 25 will send an impulse, according to the table of Fig. 7, in time unit No. 31, under the control of sources *Pa1*, *Pb1*, and *Pc2*. When this line is connected, for example, to source *Pd5*, said source suppresses the impulse 31 in all time units except the fifth period of 120 time units, so that under these conditions, an impulse is only sent in the third time unit of the fifth period, i. e. in time unit No. 511.

The cathode circuit of amplifier tube SVA3 is normally connected to earth through a resistance GRS[1]; under these conditions the grid is sufficiently negative with respect to the cathode so that the impulses sent through the gates to the grid circuit do not fire the tube. When the common control circuit is seized the relay GB, through its make contact *gb3*, applies a potential of about —20 v. to the cathode of tube SVA3 due to the fact that a circuit is completd from the cathode of a suppressor tube SVA4 to the cathode of SVA3. Tube SVA4 is made up of the right hand triode of the double triode of which amplifier tube SVA3 forms part. The suppressor tube is so connected that its cathode is at a potential which maintains its grid at a potential of —21.5 v.

Consequently when contact *gb3* is closed, the cathode of amplifier tube SVA3 is also brought to a potential of —20 v. In these conditions the relative potentials of cathode and grid are such that, in fact, the impulses from the gates cannot alone influence the tube; they are only intended to charge a small condenser GC1 which directly connects the grid to impulse source *d2*, the characteristics of which are also shown in Fig. 6. When this impulse source *d2* supplies a short impulse at a moment when the condenser is already charged by an impulse from the gates, the potential of the grid is momentarily brought to such a value that current begins to flow in the anode circuit. A short impulse is then sent to the anode circuit of the two triodes SVA1, SVA2, forming the other double triode and acts in such a way on these triodes, via a transformer connected to said double triode, that said triodes generate an impulse which is transmitted from their cathode circuit to the associated final selector circuit. This impulse thus begins at the same time as impulse *d2*, i. e. towards the end of the time unit in which an impulse is sent by a particular line, as can be seen in Fig. 6. The length of the regenerated impulse is approximately equal to one time unit of source *Pa*, so that it is still sent during the next time unit in which said source *Pa* sends an impulse.

As the isolated lines are connected to the impulse source *Pd4* it is clear that all the isolated lines which are available are sending an impulse for a series of time units numbered 361–480. All these impulses are sent through the final selector to the register circuit through the back contact *hm1* make contact *fa6*, back contact HB1 and the wire D to the register.

The positive impulses sent back on the D wire are sent to the grid of the thermionic tube *Va1* (Fig. 1) through the back contact *ok4*. Normally, the grid of *Va1* is very negative owing to the fact that the resistance inserted between the positive earth and the grid is of four megohms, while the resistance inserted between the negative battery of 48 v. and the grid is only of 1 megohm. The grid of the twin tube *Va2* and that of each of the two other twin tubes *Va3*, *Va4*, are also very negative owing to the fact that they are connected permanently to a negative battery through 500K.

It will be assumed that the register controller has recorded the two digits on a decimal basis in accordance with a well known method and that the said digits have been translated in accordance with a system on a 4, 5, 6 basis, as was necessary for the control of the selection in a system like that under consideration. The translating means provided may be of a well known type, and have been employed in register controllers for some years. Such means, such as light current electromagnetic relays of the telephone type, then effect the connection of one source in each of the groups of sources *Pc*, *Pb*, *Pa* in accordance with the translation that has just been made; said sources are connected through the following circuits; back contact *ph3*, back contact *or2*, make contact *ch2*, and grid of the tube *Va2*; back contact *or3*, back contact *ph5*, and grid of the tube *Va4*; back contact *ph6*, back contact *si5*, back contact *ot4*, and grid of the tube *Va3*.

The circuit arrangements previously described have been provided in accordance with the switch system practice which has been in use for a number of years, and are within the competence of any switching circuit engineer; it is therefore considered that the insertion of detailed circuits and the description of such arrangements would uselessly prolong the specification and would be liable to make the invention less clear.

Each of the impulses received on the grids renders the corresponding tube conductive and the cathode, which is normally negative, becomes positive by reason of the high resistance of the cathode circuit compared with that of the anode-cathode path.

The two twin triodes *Va1*, *Va2*, *Va3*, *Va4* have their cathodes interconnected through the rectifiers *Rc1*, *Rc2*, *Rc3*, *Rc4*, and all connected in parallel to the grid of the tube *Vo2* through a wire common to all the cathodes.

When each impulse is received on a grid, current will flow from the exchange battery to the impulse source of —16 v. through the grid resistance and the rectifier corresponding to the source concerned; the grid will be brought to —16 v. potential during the period of said impulses; the corresponding tube then becoming conductive. At any other time, a —40 v. potential will be applied to the grid of the corresponding tube and said tube will not be conductive.

Impulses from a source *d3* are applied regularly to the grid of the tube *Vo2*, which forms part of a twin triode *Vo1*, *Vo2* adapted to produce impulses. As long as one or more of the cathodes of the tubes *Va1*, *Va2*, *Va3*, *Va4*, are negative, each impulse *d3* is absorbed in the 20K resistance, owing to the flow of the current through said resistance, one or more of the rectifiers *Rc1*, *Rc2*, *Rc3*, *Rc4*, and the negative cathode or cathodes. However, when impulses are simultaneously applied to the grids of the tubes *Va1*, *Va2*, *Va3*, *Va4*, by the final selector, and by the sources *Pc*, *Pd*, *Pa*, selected by the digits which have been recorded, all the cathodes become simultaneously positive and the corresponding impulse *d3* renders the grid of *Vo2* positive, since there is no flow of current through the 20K resistance and either of the rectifiers.

Consequently, tube Vo2 energises tube Vo1. Tube Vo1 forms part of an impulse regenerator circuit which also comprises a transformer TP, TS connecting the anode and grid circuits, a resistance RRS, and a varistor or thermistor TH in parallel between the grid bias and cathode circuits.

In the absence of a trigger impulse the grid of the generator tube Vo1 is polarised to a value which does not permit the operation of said tube and no current will flow through the windings TP, TS of the transformer and the tube. If a negative voltage is suddenly applied to the anode of the tube, this voltage changes sign after having been induced in the grid winding of the coupling transformer, and the grid becomes positive. If the amplitude of the applied voltage is sufficient to bring the grid potential to a value permitting the tube to operate, taking into consideration the grid bias, the generator is triggered off. Anode current begins to flow through the anode winding, the grid potential becoming for this reason more positive and in turn cause a fresh increase of anode current. Thus, the grid potential almost immediately becomes higher than that of the cathode; a fairly heavy grid current begins to flow, which limits any further increase in the grid voltage. At this moment the anode and grid current begins to decrease, the second more rapidly than the first, so that the difference between the ampere-turns of the anode and grid circuits continues to increase.

After a certain time, which to a great extent depends on the self-inductance of the transformer windings and the anode resistance of the tube, the grid current is cancelled. From this moment any decrease of the anode current causes a negative voltage in the grid winding, which in turn causes another decrease of the anode current. Thus, the tube is rapidly shut off, and remains in the normal condition until a fresh trigger impulse is received. In this way, a current impulse of substantially rectangular form is produced in the cathode circuit, the amplitude and duration of said impulse not being dependent on the amplitude or the shape of the trigger impulse.

The load resistance inserted in the cathode circuit of the generator tube transforms the current impulse into a voltage impulse; said voltage is maintained at a substantially constant value for the whole period of the impulse owing to the presence of the thermistor TH.

One impulse will be produced for each trigger impulse applied to the anode. The voltage impulse produced on the terminals of the load resistance of Vo1 is applied to the final selector through the rectifier *Rcp* and the wire C.

The impulse sent on the C wire will also cause the firing of the cold cathode tube V*ia*, of which the cathode is at the potential of −150 V., which causes the energisation of relay *Si* through the following circuit: cathode and anode of tube V*ia*, back contact *ph*7, relay S*i*, back contact *ok*6, earth. The tubes V*abu*, V*ca* . . . V*oh* are not fired at the moment concerned, on account of the control exerted on their control electrode by the associated rectifier systems.

Relay *Ot* is energised through the following circuit: back contact *or*1, back contact *cs*5, make contact *si*4. The closing of contact *ot*1 causes the connection of the test relay T to the wire A.

The impulse is retransmitted by the register to the common control circuit through the following circuit: wire C, back contact HB2 in the final selector, make contact *fa*2 and cold cathode tubes VRA1 . . . 6, VRB1 . . . 5, VRC1 . . . 4; it arrives in the time unit following the one in which the tube SVA3 has received an impulse.

These fifteen tubes are each controlled by a gate connected with one of the time impluse sources of which the diagram and the assignment have been indicated in Figs. 6 and 7, said tubes only being able to be ionised at specific times.

Thus, for example, tube VRA1 is controlled by the impulse source R*a*1, the tube VRA2 is controlled by the source R*a*2, and so on, so that a tube such as VRA1 can only be ionised in one of the time units in which the source R*a*1 is at a relatively positive potential, that is, according to Fig. 7 in time units 1, 7, 13 etc.

Similarly, the tube VRB1 . . . 5 are each connected through a gate to one of the sources R*b*1 . . . 5, so that a tube such as VRB1 can only be ionized in one of the time units in which the source R*b*1 is at a relatively positive potential, that is, the time units 1 . . . 6, 31 . . . 36, 61 . . . 66, etc.

Similarly, the tubes VRC1 . . . 4, are controlled by the sources RC1 . . . 4, of which the sending periods may also be found in Fig. 7.

Finally, there is an additional tube V*d* which is not controlled by gates and is ionised owing to this fact when it receives an impulse from the register through the C wire in any time unit.

It will be clear from the foregoing that an impulse arriving in any time unit will always cause the ionisation of one tube in each of the three groups VRA, VRB and VRC so that a combination of three tubes taken from each of the three groups, characteristises a time unit.

For example, in the case of an impulse from outlet No. 25 during a period of transmission of the source P*d*5, an impulse is produced in time unit No. 511, that is, in time unit 120×4+31, as has previously been explained, and will arrive on the cold cathode tubes of the common control circuit in time unit No. 512.

This impulse is received in a time unit in which only the sources R*a*2, R*b*1 and R*c*2 are at relatively positive potential, so that the tubes VRA2, VRB1 and VRC2 are ionised and cause the operation of their anode relays A*b*, B*a*, C*b*.

The final selector circuits have been provided for use with a multi-switch having the following characteristics.

The switch comprises a certain number of horizontal bars, each of which may be considered as representing an individual switch capable of handling a call like a single-motion switch of the well known type. 100 outlets have been provided common to all the individual switches and accessible through said switches.

When a vertical bar and a horizontal bar have operated successively, a certain number of contacts are closed at the point of intersection of these bars, the individual switch being connected to the output concerned through said contacts. In the switch shown, this number of contacts is five; these contacts, placed at an intersection point, are designated by A, B, C, D and E; at the right of these contacts are shown the connection to the outlets accessible through the vertical bar concerned; to the left of these contacts are shown the connections associated with the individual switch. The 100 outlets are divided into two groups of 50, 50 co-ordinate points being provided between each horizontal bar and the vertical bar with two sets of five contacts for each co-ordinate point. Each vertical bar is associated with an individual operating electro-magnet, the energisation of said magnet actuating the bar upwards. One horizontal bar is provided for each of the $x$ individual switches, which make up the multi-switch, an individual horizontal magnet HM is provided for each of the switches and two horizontal servo-magnets SHMA, SHMB are provided in common for all the switches. The operation of an individual horizontal magnet does not energise the corresponding horizontal bar, but the operation of a horizontal magnet followed by one of the horizontal servo-magnets actuates the corresponding horizontal bar to the right or to the left in order to close either one of the series of contacts at the co-ordinate point determined by the vertical bar and the horizontal bar which have operated.

It will be seen that each of the two groups of outlets of the switch correspond to sixty time units taken in the cycle of 120 time units. Each of the two sets of sixty time units comprises 6×5×2 combinations of the sources P*a*, P*b*, P*c*. Referring to the common control circuit, it will be seen that the relays C*a* . . . C*d* correspond to the four time units P*c*, C*a*—C*b*, C*c*—C*d* characterising respectively the two groups of fifty outlets, 00–49, and 50–99, C*a*, C*c* and C*b*, C*d* each respectively characterising the two groups of 25 series of contacts 00–24, 50–74; and 25–49, 75–99 which are controlled by the vertical magnets 1–25 and 26–50. The first group of outlets is connected by a selection operation by one of the horizontal servo-magnets SHMA; the second group of outlets is connected by a selection operation by the other horizontal servo-magnet SHMB. The relays G*d* and GE respectively are actuated to control the selection operations under the control of the relays C*a*, C*b*, and the relays C*c* and C*d*.

If we refer to the table in Fig. 7 we find the impulse sources P*a*, P*b*, and P*c* for each of the outlets. As has been indicated, the sources R*a*, R*b* and R*c* are used in relation to the sources P*a*, P*b* and P*c* in such a way that outlet No. 25 which corresponds in said table to the sources P*a*1, P*b*1 and P*c*2, also correspond to the sources R*a*2, R*b*1 and R*c*2, the register tubes VRA2, VRB1 and VRC2 and the associated relays A*b*, B*a* and C*b* operating for outlet No. 25. This is in accordance with the combination of contacts making it possible to actuate the vertical magnets one of which is shown in Fig. 5 the contacts *ab*6, *ba*2 and *cb*1 causing the operation of the vertical magnet VM No. 26. Similarly, in outlet No. 74, the sources R*a*6, R*b*5 and R*c*3 will cause the energisation of relays A*f*, B*e*, C*c* and magnet VM No. 25 will be energised through the contacts *af*5, *be*1 and *cc*1.

First of all, a circuit is completed for one of the 50 vertical magnets VM; thus, for example, this circuit is as follows for outlet No. 25: make contacts of relays A*b*, B*a* and C*b* actuated by the tubes VRA2, VRB1 and VRC2 and vertical magnet No. 26.

Secondly, one of the relays GD and GE pulls up, on account of the operation of one of the relays C*a* . . . C*d* in series with one of the tubes VRC1 . . . 4; the relay GD operates under the control of one of the relays C*a* or C*b* through contacts *ca*2 or *cb*2; relay GE operates under the control of one of the relays C*c* or C*d* through the contacts *cc*2 or *cd*2. The vertical magnet which has operated completes a holding circuit for itself through its own make contact *vm*1, one of the make contacts *gd*5 or *ge*5, relay GH and earth. Relay GH opens through its back contact *gh*1 the circuit of relay GB.

At the same time, the vertical magnet VM which has been energised actuates the associated vertical bar upwards; the vertical bar No. 26 is actuated in the case of a call to outlet No. 25, and vertical bar No. 25 is actuated in the case of the outlet No. 74. These two bars control contacts which are respectively connected to outlets No. 25 and 75 and the outlets No. 24 and 74.

A circuit is closed by one of the contacts *gd*4 or *ge*4 to one of the contacts associated with each vertical bar actuated, so that a special circuit can be completed to the scanning device for identifying the class of the selected outlet, as will be described.

As has been indicated, the register controller has caused the connection of the test relay T on the wire A. Relay T is then energised, through the following circuit: earth, relay T, make contact *ot*1, wire A, back contact HB4 in the final selector, make contact *fa*5, relay GC in the common control circuit, 240-ohm resistance, battery. The relay GC pulls up. The closing of contact *t*1 completes a double test circuit through relays D*t*, T, in accordance with a well known method; the relay D*t* is energised also, provided that the line concerned has only been selected by the register controller concerned. The contacts *ot*6 and *dt*3 are both maintained open, so that all the class-of-line relays O*a* . . . O*h*, which are in the operative position, fall back. Contact *dt*4 is closed and energises relay C*s*. The closing of contact *cs*2 causes the energisation of relay O*r* provided that all the relays of outlets O*a* . . . O*h* have returned to normal due to the opening of contacts *ot*6 and *dt*3. The contact *or*1 is opened and restores relay O*t* and its associated contacts, to normal, so that earth is again applied to the relays and class-of-outlet tubes O*a* . . . O*h*, VO*a* . . . VO*h*. The operation of relay GC in the common control circuit completes a holding circuit for that one of the relays GD or GE which has operated, so that this relay, like the magnet VM which has operated and is controlled by GD or GE, is rendered independent of the position of the anode relays C*a* . . . C*d*.

As has been indicated, the return impulse transmitted by the register through the wire C has energised the tube V*d*. The operation of tube V*d* causes a positive potential to be applied to the potentiometer which supply the bias for tube SVA4. Normally this tube is not conducting and the cathode is maintained at a negative potential which in turn maintains the cathode of tube SVA3 at such a potential that that tube may operate. When the positive potential from the cathode of tube V*d* is applied to the grid of tube SVA4, this tube conducts and the increased potential of the cathode raises the potential of the tube SVA3 sufficiently to shut off that tube and prevent other pulses from being transmitted to the register over the wire D.

The relay GF is energised in series with the tube V*d* and short circuits the winding of relay GB, so that said relay begins to release slowly. Before the relay GB can release completely, relay GC can operate, so that the circuit of the relay GB is opened by the back contact *gc*3, relay GB releasing immediately. In releasing it opens its contact *gb*1, which in turn opens the anode circuits of all the cold cathode tubes, so that the tubes which were ionised are extinguished, thus causing the release of the corresponding anode relays. The opening of contact *gb3* does not put the tube SVA3 out of action, since contact *gc4* is closed, and removal of the positive bias on the grid of tube SVA4 prepares tube SVA3 for again transmitting pulses.

After having thus determined the identity of the line selected, a control operation will be effected in order to determine the particular class of the outlet.

To do this an impulse is sent to the register in one of the twenty time units, *Pa6*, 12, 18, etc., shown in the second column of the following table, this time unit being determined by the particular vertical bar of the switch which is operated:

*Distributor frame line category connections*

| Line Category | Time Position | Class of Line |
|---|---|---|
| 1 | 6 | Ordinary line; or last line of a small P. B. X group; or any line of a large P. B. X group other than the last line. |
| 2 | 12 | Limited service line. |
| 3 | 18 | Line of a subscriber absent a long time. |
| 4 | 24 | Line of a subscriber having a changed number. |
| 5 | 30 | Reserve for routine testing. |
| 6 | 36 | Available position (1st party line). |
| 7 | 42 | Avaliable position (2nd party line). |
| 8 | 48 | Available position (3rd party line). |
| 9 | 54 | Available position (4th party line). |
| 10 | 60 | Reserved for routine testing. |
| 11 | 66 | 1st line of a non-numerical P. B. X group. |
| 12 | 72 | Any line of a small P. B. X group (with consecutive numbers) other than the last line. |
| 13 | 78 | 1st line of 1st large P. B. X group (with nonconsecutive numbers). |
| 14 | 84 | 1st line of 2nd large P. B. X group. |
| 15 | 90 | Reserved for routine testing. |
| 16 | 96 | 1st line of 3rd large P. B. X group. |
| 17 | 102 | 1st line of 4th large P. B. X group. |
| 18 | 108 | 1st line of 5th large P. B. X group. |
| 19 | 114 | 1st line of 6th large P. B. X group. |
| 20 | 120 | Reserved for routine testing. |

This impulse is produced in the following manner:

Each group of five individual lines F, where they come together, are connected through a rectifier DRCS and a resistance COR to a wire COL which is also connected through a resistance to an earthed battery. The junction of the rectifier DRCS and the resistance COR is connected to the source *Pa6* through a rectifier ERCP. When relay GC is operated, the source *Pa6* is also connected through a make contact *gc1* and a rectifier to the potentiometer OPT connected to the grid circuit of tube SVA3. If earth is now applied to one of the wires COL, current can flow through the associated rectifier EPCP at all times except when this rectifier is blocked by the pulse from the source *Pa6*. A positive pulse will therefore appear at the point of juncture of the associated five lines at one of the time units of *Pa6* determined by the particular *Pb* pulse and *Pc* pulse applied to rectifiers BRCP and CRCP of the particular branch of the gating circuit. Thus, if pulses *Pb1* and *Pc1* are connected to the particular branch circuit, the only *Pa6* pulse to appear on the grid of tube SVA3 will be in the No. 6 time unit. Pulses *Pb3* and *Pc1* will produce a pulse in the No. 18 time unit, while the pulses *Pb1* and *Pc2* will produce a pulse in the No. 36 time unit.

It is necessary then to earth a particular one of the twenty wires COL to produce a pulse identifying the class of the line. For this purpose the make contacts VB3 and VB4 associated with the vertical bars are connected by jumpering, for each of the lines, to one of the 20 class-of-outlet wires COL, according to the class to which the outlet belongs.

It will be seen that all these time units correspond to the last time unit of each of the 20 successive groups of six time units *Pa*, in a group of 120 time units defined by the sources *Pa*, *Pb* and *Pc*. The first stage of gates controlling the COL wire of the twenty classes-of-outlets is connected in all cases to the source *Pa6*. There are thus twenty time units which are not associated with the outlets 00 . . . 99, according to the table of Fig. 7. The second and third stages of gates are controlled by the sources *Pb* and *Pc*, and are the same as those controlling the scanning of the 100 test wires.

Consequently, according to the class of the selected line, earth will be connected to one of the twenty class-of-outlet wires through the contact of the vertical bar which corresponds to the selected line; impulses will be transmitted in the corresponding time unit to the amplifier tube SVA3, which is maintained in working condition due to the fact that the battery is maintained on its cathode through the make contact *gc4* before the contact *gb3* has been able to open, said tube then being able to correspond to the impulses. These impulses are sent once during each cycle of 120 time units; the tube is "triggered" once through each cycle of 120 time units by means of the detector impulse supplied by the source *d2*, which is connected to the grid of the tube SVA3 through the small condenser GC1, as already explained. This occurs at the exact moment when the impulse is supplied by the source *d2*, that is, exactly at the end of the time unit in which an impulse is supplied through the wire COL.

This impulse is then regenerated in accordance with the method described for the selective impulses.

The regenerated impulse is then transmitted to the register through the wire D. In the register the operation of contacts *or2*, *or3*, during the checking of the release of the class-of-outlet relays Oa . . . Oh, has disconnected the grids of the tubes *Va2*, *Va4* from the sources *Pc* and *Pb* in order to connect them to earth through a 50,000 ohm resistance. Owing to this, the cathode of tubes *Va2* and *Va4* is positive, so that from this moment, the rectifiers *Rc2*, *Rc4* are non-conductive and cannot absorb the impulses from the source *d3* connected to the grid circuit of the tube *Vo2*. At the same moment, the tube *Va3*, on account of the release of relay *Ot*, is connected to the impulse source *Pa1* through the back contact *ot4* and the make contact *si3*. Consequently, rectifier *Rc3* now absorbs all the impulses coming from the source *d3* which correspond to the transmission periods of the sources *Pa2* to *Pa6*. It does not absorb the impulses corresponding to the periods of transmission of the source *Pa1*. Consequently, the register may be influenced by the impulses arriving in one of the time units corresponding exclusively to the periods of transmission of *Pa1*, and will not react to any of the impulses which might arrive during periods corresponding to the control of selection.

It will be seen that during the selection of the line, a first discrimination may be made by one of the various sources *Pd*, but a second discrimination is made by the various combinations *Pd*, *Pc*, by a series of class-of-outlet operations. The objects of these two different discriminations will become apparent later on.

When the impulse corresponding to the class selected is applied to the wire D in a time unit of transmission of the source $Pa1$, the tubes $Va1$ and $Va2$ are simultaneously conductive and an impulse is sent to tube $Vo2$. The impulse generator, comprising the tube $Vo1$, then produces a regenerated impulse which begins at the moment when the source $d3$ is positive, this impulse being transmitted on the wire C. This impulse has no effect on the common control circuit of the final selector since its contact $gb1$ is open, but it is applied to the tubes $Voa$ . . . $Voh$ in the register. According to the time unit in which said impulse is received, it will coincide with the impulses $Rb$, $Rc$ and $Ra1$ applied through rectifiers to the resistances of the control electrodes of a particular pair of tubes $Voa$ . . . $Voh$. In the case of a call to an isolated line, the tubes $Voa$, $Voe$ controlling the operation of relays $Oa$, $Oe$ are fired, and the corresponding relays pull up.

The relay $Ok$ is then energised through back contact $ot5$ make contact $dt2$, make contact $oe4$, make contact $oa1$.

The operation of relays $Oa$ and $Oe$ release the relay $Or$ on account of the opening of the contacts $oa3$ and $oe3$, and relay $Si$ is released on account of the opening of contact $ok6$. The opening of contact $ok5$ removes ground from the wire B, so that relay FA in the final selector completes the following holding circuit for itself; magnet HM, make contact $fa4$ and inlet wire E earthed.

As soon as the magnet HM has operated, it opens its back contact $hm2$, thus removing ground from the wire B of the final selector. The relay $Ch$ had momentarily remained held, after the removal of earth at $ok5$ from the wire B, by the earth coming from the selector through said wire B, back contact $hm2$, magnet HM, make contact $fa4$, wire E and earth in the cord circuit; it now releases thus checking the complete operation of the magnet HM and the final selector.

The earth through the make contact $dt4$, make contact $cs1$, back contact $ch1$, make contact $ok4$, in the register and the wire D now causes the energisation of the horizontal servo-magnet SHMA or SHMB in the common control circuit of the final selector, which has been connected to the wire D on account of the operation of one of the relays GD or GE. The horizontal servo-magnet operates the horizontal bar.

If the magnet SHMA has been energised, the horizontal bar of the final selector in which the horizontal magnet HM had been previously energised, is actuated in a certain direction, towards the left, for example, while if the magnet SHMB has operated, the horizontal bar is actuated in the other direction, for example to the right.

The contacts A . . . E are actuated in order to make the connection to the desired line, and back contacts HB1 . . . 4 of the selector circuit are also actuated in order completely to disconnect the individual circuit of said selector from the associated common control circuit.

The test relays T, $Dt$ in the register return to normal. The relay $Cs$ releases due to the opening of contact $dt4$ and that of contact HB1 in the final selector circuit, since the relay $Cs$ was held through the following circuit; wire D, back contact HB1, make contact $fa6$, make contact $hm1$, make contact $shm1$ or $shmb1$, earth.

The relay DT produces at $dt2$ the release of the relay $Ok$. The register controller is then completely released in the well known manner, the connection then being applied between the calling and desired lines in a manner which is equally well known.

The above explanation applies to the selection of a free line. When a line is engaged, the electrical condition characterising the availability of said line is replaced by an electrical condition characteristic of the busy condition. This is done by preventing the line-identifying, time-unit impulses, which, in the case of a free line, are supplied by one of the sources $Pd4$ . . . $Pd10$, connected to the individual resistance $Rg$, and occur during the time of that source, from reaching the amplifier tube SVA3, and by replacing these impulses by others also identifying the line but supplied by one of the sources $Pd1$ or $Pd2$ according to whether the line is engaged by a local call or by a toll call. In this case, the source $Pd1$ is connected (at a point not shown) to the D wire of the desired line by the cord circuit used in the existing connection, while the source $Pd2$ is connected (at a point not shown) to the D wire of the desired line, by the inlet circuit employed in the toll connection. A resistance $Rhp$ in parallel with a rectifier $Rcp$ is inserted on the wire D of the final selector in series with this connection, as has been shown. Consequently, when the source $Pd4$ is relatively positive (−16 v.), the wire coming from the resistance $Rg$ is maintained at a potential of −40 v., because this wire is connected through the wire D of the subscriber over another final selector circuit which has engaged the line to the source $Pd1$ or $Pd2$ which at this moment is at the potential of −40 v. While the rectifier $Rcp$ inserted in the wire D of the final selector circuit has a low resistance under these conditions, the difference of potential existing between this wire (−40 v.) and the source $Pd4$ (−16 v.) is absorbed in the resistance $Rg$. In this way the impulses line-identifying during the time of the pulses from the sources $Pd4$ . . . $Pd10$ will no longer be transmitted to the amplifier tube SVA3. Instead, a line-identifying impulse will be sent during the time unit in which one of the two sources $Pd1$ or $Pd2$ is positive, according to whether it is the source $Pd1$ or $Pd2$ which is connected over the other circuit to the wire D of the subscriber. When this source is positive (that is, in the time units 1 . . . 120 for the source $Pd1$ and in the time units 121 . . . 240 for the source $Pd2$), current will flow from this source connected to the other circuit through the resistance $Rhp$ inserted on the D wire of the other final selector circuit (rectifier $Rcp$ which is in parallel with resistance $Rhp$ is not conductive under these conditions), and, thence to the subscriber's D wire and to the rectifiers ARCS, BRCS, CRCS of the common control circuit. When the gates associated with the line are all three conductive, which happens in one of the 120 time units characterising this line, the potential of the D wire and consequently that of the grid circuit of the amplifier tube, is modified, the tube SVA3 then causing the transmission of one impulse through the regenerator circuit which comprises the tube SVA1.

It will be noticed that, although the subscriber's D wire may now be at a potential of −16 v. during a period in which the source $Pd4$ is at −40 v., this source cannot influence the potential of the D wire owing to the fact that the rectifier $Rcs$ in series with the resistance $Rg$ is not conductive under these conditions.

When a busy single line is wanted, it is clear from the foregoing that no impulse will be transmitted for this line during the time unit in which $Pd4$ is at −16 v., but that an impulse will be sent while $Pd1$ or $Pd2$ is at −16 v.; when the line is engaged in a local call, the impulse will be sent while $Pd1$ is at −16 v., and when the line is toll busy, the impulse is sent while $Pd2$ is at −16 v. The impulse will be received in the register in the time unit following that in which the impulse is transmitted by the gate for the line concerned, according to the table of Fig. 7. The connections of the register are so arranged that the tube $Vo2$ is influenced by an impulse in a time unit determined among the 100 possible time units, independently of the periods 1 . . . 120, 121 . . . 240, 241 . . . 360, 361 . . . 480 . . . in which the said time unit may occur. This time unit is determined in the register exclusively by the combinations of the tens and units digits of the desired subscriber's number, as has been previously indicated.

Consequently, if the line is locally busy, the tube $Vo2$ of the register operates under the action of an impulse produced by the desired line during the period 1 . . . 120; if the line is toll busy, the tube will operate when it receives impulses during the period 121 . . . 240. In both cases the register, responding to the impulse received, regenerates said impulse and sends it on through the C-wire to the common control circuit in accordance with a method previously described, thus producing the ionisation of the cold cathode tubes in the common control circuit, as has been explained; said tubes are in fact controlled by sources characterising the time units 1 . . . 120 in an identical manner for any of the successive periods of 120 time units. The tube $Vabu$ in the register is controlled by a rectifier $Rcbu$, connected to the impulse source $Rd1$, in such a way that it can be ionised in any one of the 120 time units of the first period; when the register responds to an impulse in any time unit of the first period 1 . . . 120, the tube $Vabu$ is ionised, thus operating relay $Bu$ and recording the local busy condition of the desired line. If an impulse arrives in any one of the time units 121 . . . 240, a different tube (not shown), which is controlled by a rectifier connected to the source $Rd2$, is ionised and records the toll busy condition of the desired line.

In addition to these tubes, the tube $Via$ at the register, which is not controlled by a rectifier, is ionised in the same manner as for the call to a free line, in order to give the register a signal indicating that the selection is finished.

According to the selective signals which have been received by the cold cathode tubes in the common control circuit, this circuit will now signal to the register the class of the wanted line exactly in accordance with the same method as for a free line. As it has been assumed that the line concerned was a single line, the relays $Oa$ and $Oe$ are energised.

In the case in which the desired line is a P. B. X line of a group comprising lines with non-consecutive numbers (a large P. B. X group) the resistance $Rg$ is connected to one of the sources $Pd5$ to $Pd10$; this source will be brought to a potential of −16 v. in the corresponding period, so that an impulse will be sent in one of the 100 time units which characterise this line during the period determined by the source $Pd$ which has been connected, provided that the line is free. If this is the case, the operation is exactly the same as that described for a free single line; in effect, when the register responds to an impulse during one of the periods corresponding to one of the sources $Pd5$ . . . $Pd10$, it produces in the register the ionisation of a cold cathode tube in order to indicate that the selection is applied exactly as was the impulse which had been received during the period corresponding to the source $Pd4$, because the register responds during any one of these periods to an impulse received in a time unit which characterises a combination of tens and units digits, thus causing ionisation of the tube $Via$ during any one of these periods, this tube not being controlled by any source through a rectifier. Moreover, the cold cathode tubes of the common control circuit may operate exactly in the same manner during any period corresponding to the sources $Pd$, owing to the fact that they are controlled by sources which only characterise an individual time unit in a group of 120 time units.

The specific class-of-line indication, as it has been given for the lines (P. B. X) has no influence on the operation, inasmuch the line has been found free.

P. B. X lines of this type (large group), while having their resistance $Rg$ connected to one of the sources $Pd5$ . . . $Pd10$, are engaged or busied exactly according to the method already described for a single line, so that the impulses supplied by the sources connected through $Rg$ are suppressed and impulses are supplied in their place by one of the sources $Pd1$ or $Pd2$ through the desired subscriber's D-wire.

Consequently, when a desired line of this type is busy, the operation is first of all exactly the same as for a busy single line, as has already been described, until the moment when the class-of-line indication is received.

With regard to those lines which do not correspond to the common call number of the group, i. e. lines other than the first line of this large group, the class-of-line indication is given as for a single line and consequently the call is treated in the same way as for a busy single line; that part of the connection which has been completed is released, and a busy tone is sent to the calling subscriber, the common control circuit being restored to normal.

With regard to the line corresponding to the common calling number of the group, i. e. the first line, the class-of-line indication is one of those listed as "first line of the first group" (P. B. X) "first line of the second group" (P. B. X) etc; in other words, an impulse will be sent in one of the time units 78, 84, 96, 102, 108 or 114 according to the group number (P. B. X).

When the register receives this class-of-line indication, it is set in such a position that it has now to hunt for one of the other lines of the group. This is done in the following way:

Prior to the class-of-line signal the operation of the relay $Si$ causes in the register, as before, the operation of the relay $Ot$ through back contact $or1$, back contact $cs5$, and make contact $si4$. Relay T is now connected to the A wire and, through contact HB4, make contact $fa5$ in the final selector circuit, causes the operation or relay GC in the common control circuit. The double-test operation takes place and causes the energisation of relay $Dt$, followed by that of relay $Ca$.

The operation of contact $ot6$ and $dt3$ causes the release of all the class of line relays $Oa$ . . . . $Oh$. Relay $Or$ pulls up, and opens its contact $or1$ in order to release relay $Ot$. The circuit of the tubes and relays characterising the classes of lines is also closed by the back contact $ot6$.

The control of the impulses received on the grids of tubes Va2, Va3 and Va4 is now modified. The grid of tube Va2 is connected to earth through make contact *ch2* and make contact *or2*. The grid of tube Va3 is connected to source Pa1 through make contact *ot4*, make contact *si3*, and the grid of Va4 is connected to earth through back contact *ph5*, make contact *or3*. Thus, there can be no impulse coincidence except during the transmission periods corresponding to the source Pa1 which are reserved for the class-of-line signals.

As may be seen on the table reproduced above, the impulse (time position No. 78) characterising the first line of the first group (P. B. X) operates relays Oc and Og. Relay Bu being energised, relay Ph is energised through make contact *og1*, make contact *oc1*, and make contact *bu2*; a holding circuit is completed through make contact *ph2* and back contact *lm1*. The operation of contact *ph7* restores tube Via and relay Si to normal and causes the connection of relay Si to tube Vib. Relay Bu releases its armature through the opening of contact *ph4*.

The controls on the grids of tubes Va2 . . . 4 are again modified. The source Pd5 is connected to the grid of Va2 through make contact *og6*, make contact *ph3*, back contact *or2* and make contact *ch2*. Sources Pa2 . . . 6 are connected in parallel to the grid of tube V6 through rectifiers, make contact *ph6*, back contact *si5* and back contact *ot4*. The grid of tube Va4 is connected to earth through make contact *ph5*.

The register is now in condition to respond to line identification impulses only during the time units which correspond to periods of emission of the sources Pa2 . . . 6, and to respond to the said impulses only when they occur during the periods of transmission of the source Pd5.

The need for two differentiations for the groups (P. B. X) will now be apparent, since small groups with consecutive lines can be connected to Pd4, as are single lines. The transmission of line identification impulses during the different periods of emission of sources Pd5, Pd6 at the moment of the first test operations, is of no significance and has not been recorded. The transmission of class-of-line impulses by means of sources Pa, Pb, Pc through one of the 20 class-of-line wires in the common control switch has indicated the desired group (P. B. X). The recording of these impulses is employed to control another selection in the final selector for the lines of the desired group (P. B. X), said lines having all their identification impulses in the period Pd allocated to the group (P. B. X). Thus, the source Pd allocated to the group (P. B. X) is a criterion for the selection of a free line (P. B. X) other than the first. It is clear that during the selecting operation in the group (P. B. X) the register does not respond to the impulses which might arrive from the free single lines or from busy lines, owing to the fact that said impulses arrive during one of the periods respectively corresponding to time units 361–480 and 1–240; only the impulses coming from the free lines of the desired group (P. B. X) which transmit their impulses during the period in which the register can receive them, can act on this circuit, which occurs during the periods corresponding to time units 481 . . . 600 for the first group (P. B. X), 601 . . . 720 for the second group (P. B. X) etc.

When a revertive impulse arrives from the final selector on the grid of Va1 during the period Pd5, for example, an impulse is produced by Vo1 and returned to the common control circuit to record the identity of the selected line. The impulse produced also causes the operation of tube Vib and relay Si.

It will be seen that when relay Ph has been energised and is caused to release relay Si, the circuit of the wire A has been opened at *ph8* and *ot1* and that consequently the relay GC of the common control circuit of the final selector is released.

The release of relay GC in the common control circuit then causes the release of relay GD or GE which in turn releases the vertical magnet VM, so that the vertical bar which has been actuated returns to normal.

The relay GB of the common control circuit can then be reenergised through the back contact *gc3*, back contact *gh1*, make contact *fa1*, back contact HB3 and earth. Battery is connected to the cathode of tube SVA3 through make contact *gb3*, the circuit then again being brought into the condition in which impulses are supplied for each of the lines to the register circuit through the gates and the amplifying and regenerating stage.

In the case under consideration, the register will respond to the impulse sent by the common control circuit in any time unit in the period corresponding to the wanted group (P. B. X), that is to say, to the impulses coming from any free line having its resistance Rg connected to one of the sources Pd5 . . . corresponding to the wanted group, said register then being able to send an impulse in the period in which said source is positive.

When the register responds, it acts exactly as described for a call to a single free line, at the moment in which such a line sends an impulse to indicate its free condition, and the subsequent operations to complete the routing of the call are exactly the same as those already described.

It should be mentioned here that the class-of-line indication for the line of a group (P. B. X) of the type concerned, other than the first, will be that of a single line, that is to say, it will be characterised by the time unit No. 6.

A small group (P. B. X) having consecutive lines may be made up by providing, by means of jumpering, a class-of-line indication for all the lines except the last, the class-of-line wire being connected to the wire COL No. 12; these lines will then send an impulse in time unit No. 72 as class-of-line indication, while the last line of the group will be connected as a single line, that is, to the wire No. 1.

The resistances of all the lines of this type of group (P. B. X) must be connected to the source Pd4, as though they were single lines.

When a call has to be routed to any free line of a group, the call will be completed exactly as indicated for a free single line, since the class-of-line indication has no influence on the routing of such call.

When calling any busy line of the group, except the last, the register receives the indication that said line is busy, exactly as previously described, after which the class-of-line indication will be signalled in the usual way. As this signalling is of the type indicating a small group (P. B. X), thus indicating that the next line in numerical order must be tested, the register, upon receiving this signal, sets itself and the common control circuit in the selecting position, as described for the type of group (P. B. X) comprising lines which are not consecutive, with this difference, however, that the register is now set in a position enabling it to respond to the impulses corresponding to the line having a calling number following that of the previously selected line; consequently this next line is now selected in accordance with the manner already described for a single line. If it is free, it is seized in a normal way; if it is busy, and if it is not the last line of the group, the operation selecting the next line is repeated, this process continuing until a free line or the last line of the group is found. This last line is characterised by the fact that its class-of-line indication is that of a single line, so that if it also is busy, it will be treated as a busy single line.

In order to simplify the register circuit, the lines of the group of this type (P. B. X) must have calling numbers only differing in their units digit, so that in order to select a next line, if necessary, it is only required to change the marking corresponding to the units digit.

The detailed operations which take place in the register for this class of P. B. X line will now be explained.

When the indication characterising the condition of the selected line is received, the relay B*u* is energized, as also the relay S*i* as previously described. The relay O*t* pulls up, as also the test relays T, D*t*. The opening of contacts *ot6* and *dt3* releases the class-of-line relays which were pulled up. Relay O*r* is energised, causing the release of relay O*t*.

Contacts *or2*, *or3* connect the grids of the tubes V*a*2, V*a*4 to earth, and the contacts *si3* connect the grid of the tube V*a*3 to the source P*a*1, so that the register, as before, is in the position for receiving a class-of-line indication. The sources P*a*2 . . . 6 are disconnected at *si5*.

The class-of-line relays which are energised when it is a question of a line (P. B. X) of the type in which the lines are consecutive are Oc, O*f*; (see in this connection the line category number 12 in the table referred to above). The relay P*h* is energised through the following circuit; make contact *of5*, make contact *oc1*, make contact *bu2*. A holding circuit is then completed through make contact *ph2* and back contact *lm1*.

In the present case, the relay I*a* is also energized through make contact *oc6*, make contact *of6*, and make contact *cs3*. Relay L*m* is slow acting and is in parallel with the relay I*a* and will only be energised shortly after said relay I*a*.

Relay I*a* causes the device which has recorded the units digit to advance one step. For example, if a single-motion register switch is employed of a well known type having 11 positions, the operation of the relay I*a* will complete a stepping circuit for the storing switch, said switch advancing one step in the well known manner. The translation of the recorded number made by well known cross-connecting arrangements will thus be modified and the source P*a* previously connected to back contact *ph6* is disconnected in order to be replaced by the adjacent source. The opening of contact *ph4* has released relay B*u* and the opening of contacts *bu2* and *lm1*, has released relay P*h*.

The simultaneous opening of contacts *ot1* and *ph8* has released relays T, D*t* in the register and relay GC in the common control circuit. Relay GB in the common control circuit is re-energised and applies battery to the cathode of tube SVA3. Line-identifying impulses are then sent by tube SVA3 over wire D to the register. Revertive impulses are then sent from the register; in the latter the grids of the tubes V*a*2, V*a*3, V*a*4 are again respectively connected to the source P*c* through the make contact *ch2*, back contact *or2*, back contact *ph3*; to the source P*a*, through back contact *ot4*, back contact *si5*, back contact *ph6*; to the source P*b* through back contact *ph5*, back contact *or3*. When the impulse from the next line is received, the same operations take place in the register as before; the successive line of the P. B. X group will be tested in the manner previously indicated as far as the last, if necessary, which gives an indication identical with that of a single line, or if the last line is busy, the register returns to normal and the connection is released.

In order to make it easy to understand the sequence of the various operations of selection and connection, as also the possibilities of the system forming the object of the present invention, we will now explain, with reference to Figs. 8–12, the general operation of the various basic circuits.

In order to make it easier to understand, we will only consider one type of source, that is to say, the sources P, said sources being assumed to be capable of energising thermionic tubes and cold cathode tubes.

It will be appreciated from the foregoing that the characteristics to be transmitted to the register are as follows:

*a*. Characteristic of position in the bank of the multiswitch, said characteristic being merged with the number of the wanted line.

*b*. Characteristic of condition; free line, local busy line, toll busy line.

*c*. Characteristic of class; normal line, cancelled or absent subscriber's line, line whose number covers groups of lines of a subscriber with several lines (P. B. X) etc.

Figure 8:
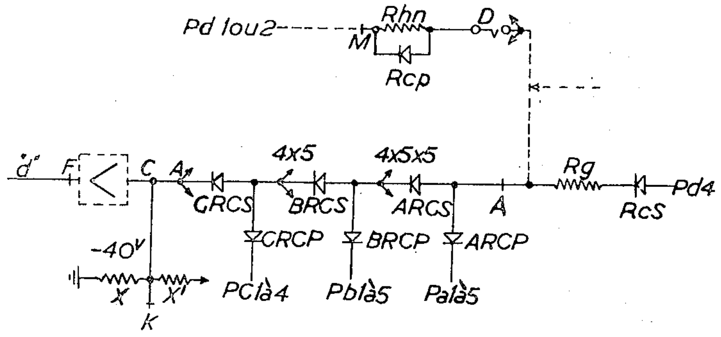
Fig. 8 shows the basic circuit of the cyclic scanning device for 100 subscribers' lines forming a part of the common control circuit of Fig. 5.

Fig. 8 shows the arrangement of the scanning device of the line selector of Fig. 5, in the case of hunting over 100 lines.

The scanning device of the line selector differs from the scanning device of the group selector described in the patent application filed by the present applicant on June 14, 1950, for "Selection system for electrical circuits or equipments," Serial No. 168,072, in this way that the three possible conditions of the scanned lines cannot be defined by a simple change of the potential on the test wire, but require the use of characteristic impulses.

For this purpose each of the 100 input points A, of which the connection to the output point C is carried out in the same way as in the group selector, is permanently connected through the resistance R*g*, to the impulse source "P*d*4." Point A is also connected to the test wire of the corresponding line. This test wire is multiplied in the banks of the primary finders and of the line selectors. If the line concerned is free, the point D is isolated and is at the potential applied to the point A by the assembly of the sources of the scanning system. If the line concerned is busy, point D is connected by the finder or selector employed in the call in hand, to a source of impulses P*d*1 or P*d*2, through a resistance R*hp* shunted by a rectifier R*cp*. The source P*d*1 is employed in the case of a city call, the source P*d*2, in the case of a toll call.

In the case of a free line, the corresponding impulse appears on point C during the time of the impulse P*d*4; in the case of a busy line, the impulse P*d*4 is "absorbed" by the source P*d*1 (or Pd2) through the resistance Rhp and the rectifier Rcp (the source Pd4 is then at —16 v., while the source Pd1 or Pd2 is at —40 v.).

In the case of a busy line, the corresponding impulse appears on the point C during the time of the impulse Pd1 (or Pd2). The rectifier Rcs opposes the absorption of the impulse by the source Pd4. The resistance Rhp is substituted for the resistance Rg to enable the sources Pa, Pb, Pc to absorb the impulse Pd1 (or Pd2) when these impulses produced by these three sources do not coincide.

All the lines are representd by outgoing impulses at the point C, but these impulses are groupd in time according to the free or busy condition of these lines.

Figure 9:
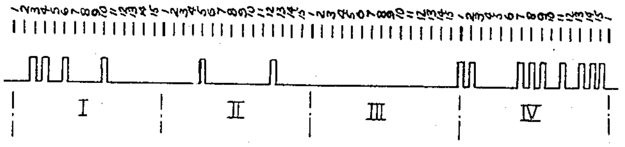
Fig. 9 shows a diagram of the voltage obtained on the output of the scanning device in the case in which there are 15 subscribers' lines available which may be free, busy with a local call or busy with a toll call.

This is shown in the diagram of Fig. 9 which indicates the potential applied to the point F on the assumption of scanning over 15 lines; the lines 3, 4, 6, 10 are engaged in local city calls (period I), the lines 5, 12 are engaged in toll calls (period II) and the lines 1, 2, 7, 8, 9, 11, 13, 14, 15 are free (periods IV).

Figure 10:
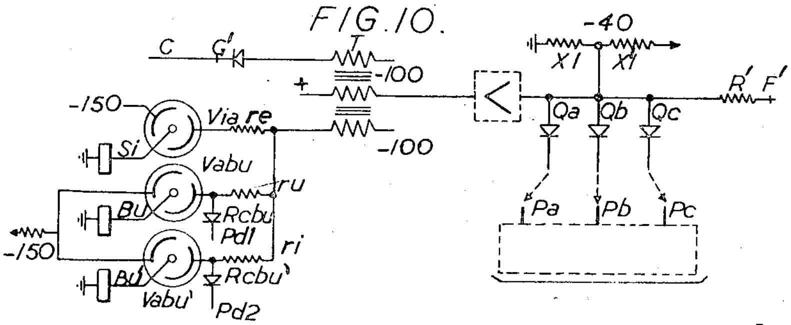
Fig. 10 shows a diagram of the basic circuit of those parts of the register involved in the selection of a subscriber's line.

The basic circuit of the comparator of Fig. 1a is represented in Fig. 10. The impulses transmitted by the scanning device reach the comparator of the register at point F' (Fig. 10). The comparison impulses are supplied by three sources Pa, Pb, Pc acting in combination through rectifiers Qa, Qb, Qc, under the effect of the members recording the tens and units digits.

When the incoming impulse coincides with the impulses simultaneously supplied by the sources Pa, Pb, Pc, connected to the input of the amplifier of the register (that is, when the scanning device produces an impulse representing the line of which the number has been recorded), this amplifier is triggered and sends an impulse to the transformer T. The latter transmits this impulse to the cold cathode tube Via, Vabu, Vabu' and to the indicator of the common control circuit through the wire C. The tube Via is triggered off in all cases and relay Si is energzsed to control the subsequent operation which the register has to complete. If the impulse received at F' occurs in the time unit of the impulse Pd4 (free line), the tubes Vabu and Vabu' remain extinguished, the impulse being absorbed by the sources Pd1 and Pd2 through rectifiers Rcbu and Rcbu', because these rectifiers are then brought to the potential —100 v. by the generators Pd1 and Pd2. If the impulse received at F' is produced in the time of the impulse Pd1 or Pd2 (line busy) one of the tubes Vabu or Vabu' is fired, the auxiliary electrode of this tube being brought to the potential of —50 v. by the simultaneous action of the impulse produced by the transformer T and that produced by the source Pd1 or Pd2. The relays Bu and Bu', by their energisation, indicate the busy state of the wanted line and thus make it possible for the register to handle the call in a suitable way.

The impulse transmitted on the wire C acts in the common control circuit on the cold cathode tube indicator of Fig. 4. A tube VRA, a tube VRB and a tube VRC are fired and indicate which line is being scanned; relays A, B, C associated therewith, by their combination energise the vertical bar corresponding to the wanted line so as to prepare the possible connection of said line. The tube Vd is held fired and blocks the amplifier by bringing the point K (Fig. 8), to the potential of —40 v. in order to stop the scanning.

The number of classes of lines may amount to 20; the 20 characteristic impulses are obtained by the combination of the impulse Pa6 with the 5 impulses Pb and the four impulses Pc. For this purpose the scanning device of the common control circuit is completed as indicated in Fig. 11.

The scanning device has 20 input points L in addition to the 100 input points AA' which are used for scanning the lines. These 20 additional points L are connected to the 20 points B through a decoupling rectifier DRCS and a resistance COR; they are controlled by the source of impulses Pa6 connected through the rectifier ERCP. The 20 points L are connected over a distributing frame to contacts V which are closed by the vertical bars of the multiswitch. Each of the 20 points L represents a class of line and by connecting the 100 points L' of the 100 scanned lines to a particular point in these points L, it is possible to allocate these 100 lines to one of the 20 possible classes.

The source Pa6 may be applied through a contact Y' to the point C of the scanning device while the blocking potential may be suppressed by a contact Y. The contact Y' corresponds to the contact gc1 of Fig. 5.

During the period of scanning the lines, all the contacts V are opened as also contact Y', and the only impulses arriving on the point C are supplied by the points AA' in the conditions already described.

When this scanning is finished, the indicator of Fig. 4 is set and the vertical bar of the multiswitch, relating to the chosen line, is actuated. The contact V corresponding to this line applies point L to earth. Moreover, the contacts Y', then Y, are actuated. The suppression of the blocking enables the scanning device again to send impulses to the register, but the connection of point C to the source Pa6 makes it possible to absorb all the impulses transmitted outside the time units in which the source Pa6 connected to rectifier ERCP is transmitting an impulse (when the potential of a source Pa6 passes from —40 v. to —16 v.). Thus, all the line-scanning impulses, being transmitted during the time of the impulses Pa1 to Pa5, are absorbed by the source Pa6 and no longer arrive on the register. On the other hand, the point L applied to earth by contact V causes the transmission of one impulse when there is time coincidence between the impulse Pa6 and the impulses Pb and Pc relating to the point L, that is to say, to the class of line concerned.

In the register the device shown in Fig. 10 is completed as shown in Fig. 12.

The comparison potential is applied to the point C' by a contact Z which is closed during the line selection. In this position the comparison potential is given by the combination of the impulses Pa, Pb, Pc, Pd sent by the selection registering members, with impulses Pa2 to Pa6. After the selection, contact Z is opened, the left-hand contact Z' is closed and the comparison potential is supplied by the source Pa1 only.

There is attached to the tube Via an indicator which, for 20 characteristics, comprises five tubes VIB and four tubes VIC corresponding to the tubes Voa . . . h of Fig. 1. The tubes VIB and VIC are respectively controlled on the one hand, by the source Pa1 and on the other hand by one of the sources Pb1 to Pb5, Pc1 to Pc4.

During the scanning, the impulses arriving on the register are transmitted in the time of the impulses Pa2 . . . Pa6 and act under the control of the impulses passing through the rectifier Q. The sources Pa2 to Pa6 connected in parallel on the rectifier Q have no special effect in this case. When an impulse is sent to the transformer T, the latter returns an impulse on the wire C and also on the tubes Via, VIB, VIC, but only the tube Via operates, the impulse being absorbed on the other tubes by the source Pa1 to which they are all connected.

When the tube Via is fired, it acts in particular on contact Z' which connects source Pa1 to point C. The common control circuit, which has also received the impulse coming on the wire C, "replaces" the scanning impulses by the class impulses which only occur in the time of the impulses Pa1. As the register is no longer sensitive except to the impulses Pa1, only the class impulse will be transmitted to transformer T, and it will act this time on the tube VIB or the tube VIC which will be controlled by the sources Pb and Pc corresponding to those of the class to be indicated. The tubes VIB and VIC energise relays OIB and OIC, of which the combination enables the register to determine how to continue handling the call.

What is claimed is:

1. In an automatic telecommunication exchange, a plurality of outlets, a common test circuit therefor, means for producing a plurality of recurring electrical pulses, spaced in time, and representing test characteristics, a selector switch circuit comprising means for connecting said pulse producing means to said outlets so as to apply a different test characteristic to said common test circuit for each outlet, each characteristic identifying the corresponding outlet, and means for automatically changing the test characteristic associated with an outlet from one to another of a plurality of different characteristics allocated individually to the outlet when the condition of the outlet changes, each characteristic allocated to an outlet identifying the outlet and its condition.

2. In an automatic telecommunication exchange a selector switch circuit having a plurality of outlets, means for producing a plurality of pulses, spaced in time, and representing test characteristics, means in said circuit for applying pulses from said pulse producing means to said common test circuit so as to apply a series of different test characteristics to said common test circuit, always equal in number $n$ to said outlets and chosen from a number of different test characteristics $m$ times the number of said outlets.

3. In an automatic telecommunication exchange, a selector switch circuit, as claimed in claim 1, and in which each test characteristic applied to the common test circuit identifies an outlet and its idle or busy condition.

4. A selector switch circuit, as claimed in claim 2, in which each outlet has $m$ different test characteristics allocated thereto and means for temporarily associating one of said $m$ characteristics therewith, in which the total number, $m \times n$, of different test characteristics constitute $m$ different sets, each set having a common factor and no two sets having the same common factor, in which one characteristic from each set constitute the $m$ characteristics allocated to each outlet, and in which a plurality of sets of characteristics are each used to characterise the identity and a particular condition of the outlets, and a plurality of sets of characteristics are each used to characterise the identity and a particular class of the outlets.

5. A selector switch circuit, as claimed in claim 4, in which an outlet is normally associated with a characteristic which characterises its identity and idle condition and in which means are provided for automatically changing the characteristic associated with an outlet when it becomes busy so as to characterise its identity and busy condition.

6. A selector switch circuit, as claimed in claim 5 and which further comprises means controlled by the means for changing the characteristic of an outlet for automatically suppressing the class of outlet indication previously given when the characteristic is changed.

7. A selector switch circuit as claimed in claim 1, and in which the electrical pulses representing the characteristics have at least as many time positions as there are test characteristics to be provided.

8. A cross bar final selector switch circuit comprising an incoming trunk, a plurality of lines, line type checking means, vertical and horizontal coordinate means, means responsive to a signal representing a wanted designation for operating said vertical co-ordinate operating means under control of said signal responsive means to select a particular line type checking means for checking the type of line selected and means for operating said horizontal co-ordinate operating means after the type of line check has been made to connect the incoming trunk to the selected line.

9. A cross-bar final selector switch circuit, as claimed in claim 8, comprising means for connecting up the line type-checking means for checking purposes both when the selected line is idle and when the line is busy.

10. A cross-bar final selector switch circuit, as claimed in claim 9, comprising means for connecting up the line-type checking means for checking purposes when the selected line is busy, and means for causing P. B. X hunting in the selector circuit when a busy line is found to be a P. B. X line.

11. An automatic telecommunication exchange which comprises a plurality of groups of lines including P. B. X lines, means for producing pulses, spaced in time and representing test characteristics, final selection means having access to several groups of lines, control equipment for said final selection means, and means for applying pulses from said pulse producing means to the lines belonging to a P. B. X which are each characteristic both of the identity of the line and of its P. B. X character.

12. An automatic telecommunication exchange which comprises a plurality of lines including P. B. X lines, means for producing pulses, spaced in time, and representing test characteristics, final selection means having access to several groups of lines, control equipment for said final selection means, means for connecting said pulse producing means representing P. B. X test characteristics to a number of lines which are located among a plurality of groups of lines accessible from said final selection means, and means for causing hunting over said lines when any one of a plurality of said lines is first selected.

13. An automatic telecommunication exchange which comprises a plurality of lines, means for producing pulses, spaced in time, and representing test characteristics including P. B. X test characteristics, final selection means having access to several groups of lines, control equipment for said final selection means, means for connecting said pulse producing means so as to apply P. B. X test characteristics to a number of consecutive lines which are located in any desired position among said several groups of lines without restriction, means for responding to the P. B. X test characteristic of a busy P. B. X line other than the last, and means for modifying the control exercised by the control equipment after a line of a P. B. X is found to be busy so that the control equipment selects and tests the next line of the P. B. X.

14. An automatic telecommunication exchange, as claimed in claim 11, and in which each said test characteristic is characteristic both of the identity of the corresponding line and the identity of the P. B. X to which it belongs.

15. An automatic telecommunication exchange, as claimed in claim 14, and in which each said test characteristic is also characteristic of the idle condition of the corresponding line.

16. An automatic telecommunication exchange, as claimed in claim 13, and comprising means for marking the selection control equipment in accordance with the recorded designation of a wanted line, and means for changing the marking of the selection control means from that identifying a busy line just tested to that identifying the next line to which said final selecting means has access.

17. An automatic telecommunication exchange which comprises a plurality of lines arranged in groups, means for producing pulses, spaced in time, and representing test characteristics including P. B. X test characteristics, cross-bar multi-switch final selectors having access to several groups of lines, register controllers, means for connecting said pulse producing means to a number of lines from a cross-bar multi-switch final selector which are located in any desired positions without restriction of group among the lines, which lines may be partially or wholly non-consecutive, or all consecutive, and which comprises means for testing said P. B. X lines in turn until a free outlet is found.

18. An automatic telecommunication exchange, as claimed in claim 17, in which the register controllers comprise means for marking the selection control means in accordance with the recorded designation of a wanted line, and which comprises means for applying test characteristics to busy P. B. X lines, and means in the register controllers for responding to P. B. X test characteristics and in response thereto changing the marking of the selection control means from that identifying a busy line just tested to that identifying the next line having access to the final selectors.

19. An automatic telecommunication exchange as claimed in claim 18 comprising means for connecting the pulse producing means so as to apply the same test characteristic to all lines of a consecutive P. B. X other than the last, whereby the same operations will take place in the register under control of any busy P. B. X line, and P. B. X hunting can take place and can start from any line in the P. B. X. other than the last.

20. An automatic telecommunication exchange, as claimed in claim 17, in which means are associated with a final selector switch for connecting the pulse producing means in such a manner as to apply individual test characteristics to idle P. B. X lines during P. B. X hunting each of which identifies the P. B. X group to which it belongs.

21. An automatic telecommunication exchange, as claimed in claim 17, in which means are associated with a final selector switch for connecting the pulse producing means so as to apply individual test characteristics to idle P. B. X lines during P. B. X hunting each of which identifies the line itself and the P. B. X group to which it belongs.

22. An automatic telecommunication exchange, as claimed in claim 17, comprising signal receiving and recording equipment, means for selecting a wanted line under control of a register controller, means for firstly applying a condition test to a selected line, means for secondly connecting said signal-receiving equipment to a selected line to receive and record information regarding the P. B. X group, if any, to which the line belongs, means operable, if the selected line is a P. B. X line and is busy, to cause P. B. X testing within the group the identity of which has been recorded, means to record the identity of an idle P. B. X line selected, and means under control of said line identity recording means for setting an individual switch of a cross-bar multi-switch final selector to said line.

23. An automatic telecommunication exchange, as claimed in claim 22, comprising means for allocating $(m \times n + o)$ different pulses representing test characteristics from the means for producing pulses to a final selector switch having access to $n$ lines, said test characteristics being divided firstly into two main groups $(m \times n)$ and $o$, the test characteristics within each main group having a factor common to the group and the common factor for each main group being different, the first main group $(m \times n)$ being subdivided into $m$ groups of $n$ characteristics each, the test characteristics within each such group having a factor common to the subgroup and no two sub-groups having the same common factor, means for allocating pulses representing $m$ test characteristics, one from each sub-group to each line, means for associating any one of its allocated test characteristics with each line for selection control purposes, and means for associating any one or more lines with test characteristics of said second main group for signalling P. B. X information.

24. An automatic telecommunication exchange, as claimed in claim 23, in which said selection control means and said P. B. X information recording means are in the register controller, in which said identity recording means is associated with the final selectors, and in which the register controllers comprise means for signalling the identity of a selected line to the identity recording means.

25. An automatic telecommunication exchange, as claimed in claim 24, in which the common factors of the different sub-groups characterise respectively the idle condition of a single line, the busy condition of a line, the idle condition of a line, and identity of a P. B. X to which the line belongs.

26. An automatic telecommunication exchange, as claimed in claim 25, and comprising means for automatically changing the idle condition characteristic associated with a line to the busy characteristic when the line becomes busy.

27. An automatic telecommunication exchange, as claimed in claim 26, in which every line characteristic of all the sub-groups also identifies the individual line.

28. An automatic telecommunication exchange, as claimed in claim 27, and comprising means for applying two tests in turn to a line from a final selector, the first test to determine that it is the wanted line and to determine whether it is free or busy, and the second test to determine the class of the selected line.

29. An automatic telecommunication exchange, as claimed in claim 28, and comprising control means operable both when said first test means has determined that a selected line is busy and when said second test means has determined that the selected line is a P. B. X line, and third test means under control of said control means for applying a test for further lines of the P. B. X in accordance with the common factor of the sub-group of test characteristics associated with said P. B. X, said sub-group test characteristics being used for controlling both the selection of a wanted line, in which case the common factor is not utilised, and for controlling P. B. X hunting in which case the common factor is utilised.

MARTINUS DEN HERTOG.
CONSTANTINUS DE ZEEUW.

References Cited in the file of this patent

UNITED STATES PATENTS

| Number | Name | Date |
|---|---|---|
| 1,631,506 | Sipe | June 7, 1927 |
| 1,812,999 | Taylor | July 7, 1931 |
| 2,454,809 | Kruithof | Nov. 30, 1948 |
| 2,504,274 | Nilsson et al. | Apr. 18, 1950 |